US011083001B2

(12) United States Patent
Choi

(10) Patent No.: US 11,083,001 B2
(45) Date of Patent: Aug. 3, 2021

(54) DATA TRANSMISSION METHOD FOR ULTRA LOW-LATENCY, HIGHLY-RELIABLE COMMUNICATION IN WIRELESS COMMUNICATION SYSTEM, AND DEVICE THEREFOR

(71) Applicant: INDUSTRY-ACADEMIC COOPERATION FOUNDATION, DANKOOK UNIVERSITY, Yongin-Si (KR)

(72) Inventor: Su Han Choi, Gwacheon-Si (KR)

(73) Assignee: INDUSTRY-ACADEMIC COOPERATION FOUNDATIO, Yongin-Si (KR)

( * ) Notice: Subject to any disclaimer, the term of this patent is extended or adjusted under 35 U.S.C. 154(b) by 0 days.

(21) Appl. No.: 17/253,628

(22) PCT Filed: Aug. 6, 2019

(86) PCT No.: PCT/KR2019/009770
§ 371 (c)(1),
(2) Date: Dec. 18, 2020

(87) PCT Pub. No.: WO2020/032523
PCT Pub. Date: Feb. 13, 2020

(65) Prior Publication Data
US 2021/0176776 A1 Jun. 10, 2021

(30) Foreign Application Priority Data

Aug. 6, 2018 (KR) .................... 10-2018-0091468
Aug. 6, 2018 (KR) .................... 10-2018-0091489
(Continued)

(51) Int. Cl.
*H04W 72/12* (2009.01)
*H04W 72/04* (2009.01)
(Continued)

(52) U.S. Cl.
CPC ....... *H04W 72/1268* (2013.01); *H04L 1/0004* (2013.01); *H04L 1/0026* (2013.01);
(Continued)

(58) Field of Classification Search
CPC ........... H04W 72/1268; H04W 72/042; H04W 72/0446; H04W 72/1231; H04W 72/14;
(Continued)

(56) References Cited

U.S. PATENT DOCUMENTS

2018/0084572 A1 3/2018 You et al.
2019/0159238 A1* 5/2019 Kim .................. H04L 5/0055
(Continued)

FOREIGN PATENT DOCUMENTS

KR 10-2015-0037461 A1 4/2015
WO 2016-163645 A1 10/2016

OTHER PUBLICATIONS

Ericsson, R1-1807583, RAN1 decisions for WI Ultra Reliable Low Latency Communication for LTE.
(Continued)

*Primary Examiner* — Peter G Solinsky
(74) *Attorney, Agent, or Firm* — Invenstone Patent, LLC

(57) ABSTRACT

Provided are a data transmission method for ultra low-latency, highly-reliable communication in a wireless communication system, and a device therefor. A method for transmitting data in a wireless communication system comprises the steps of: receiving, from a base station, information relating to the number of repeated transmissions with respect to uplink data; configuring a plurality of physical uplink shared channels (PUSCH) corresponding to the number of repeated transmissions, wherein the uplink data is likewise mapped to the plurality of PUSCH; and sequentially transmitting the plurality of PUSCH in a single slot, wherein the plurality of PUSCH comprises a first PUSCH
(Continued)

and a second PUSCH, and a first frequency resource for the transmission of the first PUSCH and a second frequency resource for the transmission of the second PUSCH can be changed so as to differ from one another in the single slot.

6 Claims, 14 Drawing Sheets

(30) Foreign Application Priority Data

| | | |
|---|---|---|
| Aug. 6, 2018 | (KR) | 10-2018-0091510 |
| Aug. 2, 2019 | (KR) | 10-2019-0094439 |
| Aug. 2, 2019 | (KR) | 10-2019-0094440 |
| Aug. 2, 2019 | (KR) | 10-2019-0094441 |

(51) Int. Cl.
*H04W 72/14* (2009.01)
*H04L 5/00* (2006.01)
*H04L 1/00* (2006.01)
*H04L 1/18* (2006.01)

(52) U.S. Cl.
CPC .......... *H04L 1/1819* (2013.01); *H04L 5/0055* (2013.01); *H04W 72/042* (2013.01); *H04W 72/0446* (2013.01); *H04W 72/1231* (2013.01); *H04W 72/14* (2013.01)

(58) Field of Classification Search
CPC ... H04L 1/0004; H04L 1/0026; H04L 1/1819; H04L 5/0055
USPC .......................................................... 370/329
See application file for complete search history.

(56) References Cited

U.S. PATENT DOCUMENTS

2021/0022082 A1* 1/2021 Baldemair ............ H04L 1/1896
2021/0058910 A1* 2/2021 Yokomakura ......... H04L 5/0048

OTHER PUBLICATIONS

WI rapporteur (Ericsson), R1-1807581, Agreement summary for Rel-15 Even further enhanced MTC for LTE.
CMCC, R1-1804103, Discussion on PUSCH repetition for grantfree transmission, 3GPP TSG RAN WG1 #92bis, 3GPP.
Samsung, R1-1804341, Discussion on blind/HARQ-less PDSCH repetition for URLLC, 3GPP TSG RAN WG1 #92bis, 3GPP.
Huawei et al., RP-181477, New SID on Physical Layer Enhancements for NR URLLC, 3GPP Information WI_Sheet, 3GPP.
Huawei&HiSilicon, R1-1805867, Blind/HARQ-less Repetition for Scheduled DL-SCH Operation, 3GPP TSG RAN WG1 #93, 3GPP.

* cited by examiner

DATA TRANSMISSION METHOD FOR ULTRA LOW-LATENCY, HIGHLY-RELIABLE COMMUNICATION IN WIRELESS COMMUNICATION SYSTEM, AND DEVICE THEREFOR

CROSS-REFERENCE TO RELATED APPLICATIONS

This application is a national stage of International Application No. PCT/KR2019/009770, filed on Aug. 6, 2020, which claims the benefit of priority to Korean Application(s) No. 10-2018-0091468, filed on Aug. 6, 2018 and 10-2018-0091489, filed on Aug. 6, 2018 and 10-2018-0091510, filed on Aug. 6, 2018 and 10-2019-0094439, filed on Aug. 2, 2019 and 10-2019-0094440, filed on Aug. 2, 2019 and 10-2019-0094441, filed on Aug. 2, 2019 in the Korean Intellectual Property Office, the disclosures of which are incorporated herein by reference.

BACKGROUND OF THE DISCLOSURE

Field of the Disclosure

The present disclosure relates to a method and apparatus for transmitting data in a wireless communication system, and more particularly, to a method and apparatus for transmitting data rapidly and stably for ultra-low latency and high-reliability communication.

Related Art

For communication in various application fields corresponding to 5G ultra-reliable and low latency communication (URLLC) scenarios, data needs to be transmitted rapidly and stably. However, in a case where a user equipment moves toward a poorer channel in an environment in which the user equipment rapidly moves, etc., if a base station configures a transport format based on a channel quality indicator (CQI) fed back from the corresponding user equipment to the base station and transmits the transport format, an error may occur. Accordingly, a situation in which the corresponding data must be retransmitted may occur.

If normal data is transmitted, there is no great problem although the data is retransmitted. If URLLC data is transmitted, there may be a problem in that latency is increased if retransmission occurs.

SUMMARY

An object of the present disclosure is to provide a data transmission method for ultra-low latency and high-reliability communication, which can transmit data with stable and short latency.

Another object of the present disclosure is to provide a data transmission apparatus for ultra-low latency and high-reliability communication, which can transmit data with stable and short latency.

Still another object of the present disclosure is to provide a data transmission apparatus for ultra-low latency and high-reliability communication, which can reduce overhead of HARQ feedback attributable to the repeated transmission of data.

Still another object of the present disclosure is to provide a multi-beamforming-based data transmission method and apparatus, which can perform communication with stable and short latency.

Still another object of the present disclosure is to provide a multi-beamforming-based data transmission method and apparatus, which can minimize time latency occurring when data is retransmitted.

According to an aspect of the present disclosure, a method of transmitting data in a wireless communication system includes the steps of receiving information on the repeated transmission number of uplink data from a base station, configuring a plurality of physical uplink shared channels (PUSCH) corresponding to the repeated transmission number, wherein the uplink data is identically mapped to the plurality of PUSCHs, and sequentially transmitting the plurality of PUSCHs within one slot, wherein the plurality of PUSCHs may include a first PUSCH and a second PUSCH, and a first frequency resource for the transmission of the first PUSCH and a second frequency resource for the transmission of the second PUSCH may be differently changed within the one slot.

According to one aspect, the method of transmitting data in a wireless communication system may further include the step of receiving information on a configuration for activating or deactivating repeated transmission from the base station.

According to another aspect, information on the first frequency resource and the second frequency resource may be indicated by at least one of radio resource control (RRC) signaling and downlink control information (DCI) by the base station.

According to still another aspect, the information on the repeated transmission number may be generated based on a channel quality indicator (CQI) report received from the user equipment.

According to still another aspect, the information on the repeated transmission number may be included in DCI received from the base station, and the DCI may include information on a modulation and coding scheme (MCS) applied to the first PUSCH and information on an MCS applied to the second PUSCH.

According to still another aspect, an MCS having a level than that of the first PUSCH may be applied to the second PUSCH.

According to still another aspect, the one slot may include a first mini-slot configured with at least one orthogonal frequency division multiplexing (OFDM) symbol and a second mini-slot configured with at least one OFDM symbol, the first PUSCH may be transmitted through the first mini-slot, and the second PUSCH may be transmitted through the second mini-slot.

According to still another aspect, the method of transmitting data in a wireless communication system may further receive, from the base station, HARQ hybrid automatic retransmission request-acknowledge (ACK) for any one of the first PUSCH and the second PUSCH.

According to another aspect of the present disclosure, a method of transmitting data in a wireless communication system includes the steps of determining the repeated transmission number of downlink data, transmitting information on the repeated transmission number to a user equipment, configuring a plurality of physical downlink shared channels (PDSCH) corresponding to the repeated transmission number, wherein the downlink data is identically mapped to the plurality of PDSCHs, and sequentially transmitting the plurality of PDSCHs to the user equipment within one slot, wherein the plurality of PDSCHs may include a first PDSCH and a second PDSCH, and a first frequency resource for the transmission of the first PDSCH and a second frequency resource for the transmission of the second PDSCH may be differently changed within the one slot.

According to still another aspect of the present disclosure, a method of transmitting data in a wireless communication system may include the steps of receiving information on the repeated transmission number of uplink data from a base station, configuring a plurality of codewords corresponding to the repeated transmission number, wherein the uplink data is identically mapped to the plurality of codewords, applying any one of a plurality of preset redundancy versions to each of the plurality of codewords, and transmitting, to the base station, the plurality of codewords to which the any one redundancy version has been applied.

According to one aspect, the information on the repeated transmission number may be included in downlink control information (DCI) received from the base station, and the DCI may include information on a redundancy version applied to a first codeword and information on a redundancy version applied to a second codeword, among the plurality of codewords.

According to another aspect, a mapping method between a virtual resource block (PRB) and a physical resource block (PRB) may be differently applied to the first codeword and the second codeword.

According to still another aspect, the transmitting step may include the step of transmitting the first codeword and the second codeword through a first mini-slot and a second mini-slot each configured with at least one orthogonal frequency division multiplexing (OFDM) symbol, respectively.

According to still another aspect, the transmitting step may include the step of forming different beams and transmitting the first codeword and the second codeword through the different beams.

According to still another aspect, the method may further include the step of receiving hybrid automatic retransmission request (HARQ) feedback for at least one of the first codeword and the second codeword from the base station, after the transmitting step.

According to still another aspect of the present disclosure, a method of receiving data in a wireless communication system may include the steps of receiving information on the repeated transmission number of downlink data from a base station, receiving a plurality of codewords corresponding to the repeated transmission number from the base station, wherein the downlink data is identically mapped to the plurality of codewords, determining whether the downlink data is successfully received based on the plurality of codewords, and transmitting hybrid automatic retransmission request (HARQ) feedback to the base station if the downlink data has been successfully received.

According to one aspect, the plurality of codewords includes a first codeword and a second codeword. The determining step may include the step of decoding the downlink data by combining the first codeword and the codeword if the first codeword has not been successfully decoded.

According to another aspect, the determining step may include the step of omitting the decoding of the second codeword if the first codeword is successfully decoded.

According to still another aspect of the present disclosure, a method of transmitting data in a wireless communication system may include the steps of determining a repeated transmission number of downlink data, transmitting information on the repeated transmission number to a user equipment, configuring a plurality of codewords corresponding to the repeated transmission number, wherein the downlink data is identically mapped to the plurality of codewords, applying any one of plurality of preset redundancy versions to each of the plurality of codewords, and transmitting, to the user equipment, the plurality of codewords to which the any one redundancy version has been applied.

According to still another aspect of the present disclosure, a data transmission method by a user equipment in a wireless communication system may include the steps of receiving, from a base station, control information including information on a plurality of beams, configuring a plurality of PUSCHs mapped to the plurality of beams, respectively, based on the information on the plurality of beams, wherein the same uplink data is mapped to the plurality of PUSCHs, and transmitting the plurality of configured PUSCHs to the base station.

According to one aspect, the control information may include beamforming information on the plurality of beams.

According to another aspect, the data transmission method may further include the step of receiving, from the base station, a radio resource control (RRC) message including at least one of the number of beams and a beam transmission method, prior to the step of receiving the control information.

According to still another aspect, the data transmission method may further include the step of transmitting a reference signal for measuring a channel state to the base station prior to the step of receiving the control information, wherein the downlink control information may be configured based on the reference signal.

According to still another aspect of the present disclosure, a data transmission method by a base station in a wireless communication system may include the steps of determining a plurality of beams for the transmission of downlink data, transmitting, to a user equipment, control information including information on the plurality of determined beams, configuring a plurality of PDSCHs mapped to the plurality of beams, respectively, based on the information on the plurality of determined beams, wherein the same downlink data is mapped to the plurality of PDSCHs, and transmitting the plurality of configured PDSCHs to the user equipment.

According to one aspect, the control information may include beamforming information on the plurality of beams.

According to another aspect, the data transmission method further includes the step of receiving a reference signal for measuring a channel state from the user equipment prior to the step of determining the plurality of beams. The plurality of beams may be determined based on the channel state.

According to still another aspect, the data transmission method further includes the step of transmitting, to the user equipment, an RRC message including at least one of the number of beams and a beam transmission method, prior to the step of determining the plurality of beams.

According to the present disclosure, if data corresponds to ultra-reliable low latency communication (URLLC), a transmitter can repeatedly transmit the same data to a receiver so that the data is transmitted with stable and short latency.

Furthermore, according to the present disclosure, data can be transmitted more rapidly and stably because the same data can be transmitted two times or more using a mini-slot.

Furthermore, according to the present disclosure, in downlink or uplink transmission, data can be transmitted more stably, compared to a case where data is transmitted based on a channel quality indicator (CQI) value determined based on channel measurement results.

Furthermore, according to the present disclosure, overhead of HARQ feedback attributable to the repeated transmission of the same data can be reduced.

Furthermore, according to the present disclosure, if data corresponds to ultra-reliable low latency communication (URLLC), a transmitter can transmit the same data several times based on multi-beamforming so that data is transmitted with stable and short latency.

Furthermore, according to the present disclosure, a case where the retransmission of data is necessary can be minimized because the same data can be combined when the data is transmitted several times through multi-beamforming and decoded.

Figure 1:
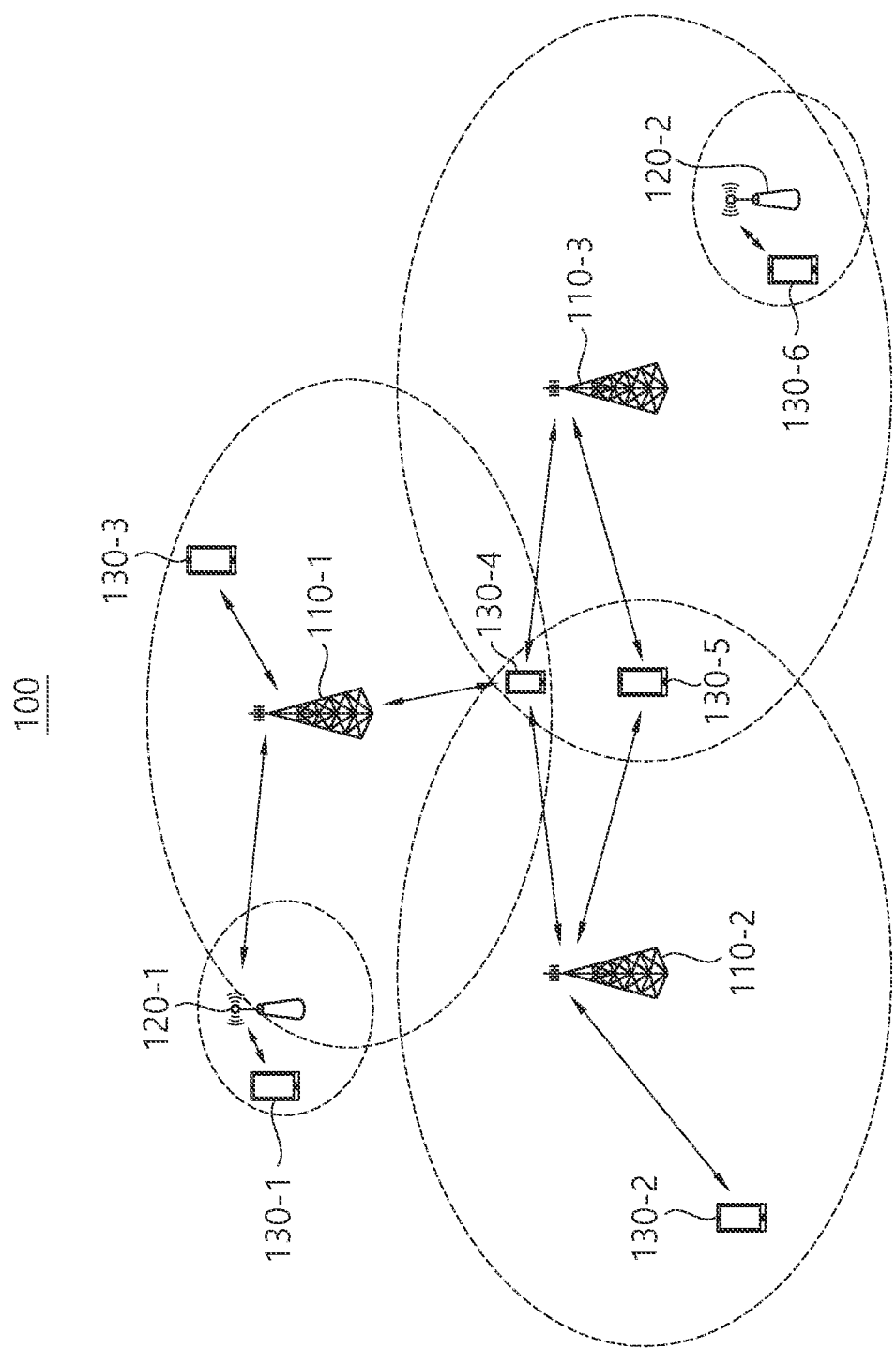
FIG. 1 is a conceptual diagram illustrating a wireless communication system according to an embodiment of the present disclosure.

DESCRIPTION OF EXEMPLARY
EMBODIMENTS

The present disclosure may be changed in various ways and may have various embodiments, and specific embodiments are illustrated in the drawings and described in detail in the detailed description. It is however to be understood that the present disclosure is not intended to be limited to the specific present disclosure and that the present disclosure includes all changes, equivalents and substitutions which fall within the spirit and technological scope of the present disclosure. Similar reference numerals are used for similar elements while each drawing is described.

In this specification, terms, such as a "first", a "second", "A", and "B", may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this specification are used to only describe specific embodiments and are not intended to restrict the present disclosure. An expression of the singular number should be construed as including an expression of the plural number unless clearly defined otherwise in the context. It is to be understood that in this specification, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Terms used in this specification, including technical terms or scientific terms unless defined otherwise, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in this specification.

Hereinafter, preferred embodiments according to the present disclosure are described in detail with reference to the accompanying drawings.

FIG. 1 is a conceptual diagram illustrating a wireless communication system according to an embodiment of the present disclosure.

Referring to FIG. 1, the wireless communication system 100 may be configured with a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA)-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, an orthogonal frequency division multiple access (OFDMA)-based communication protocol, a single carrier (SC)-FDMA-based communication protocol, a non-orthogonal multiple access (NOMA)-based communication protocol, a space division multiple access (SDMA)-based communication protocol, etc.

The wireless communication system 100 may include a plurality of base stations 110-1, 110-2, 110-3, 120-1, and 120-2 and a plurality of user equipments 130-1, 130-2, 130-3, 130-4, 130-5, and 130-6.

Each of the first base station 110-1, the second base station 110-2 and the third base station 110-3 may form a macro cell. Each of the fourth base station 120-1 and the fifth base station 120-2 may form a small cell. The fourth base station 120-1, the third user equipment 130-3 and the fourth user equipment 130-4 may belong to coverage of the first base station 110-1. The second user equipment 130-2, the fourth user equipment 130-4 and the fifth user equipment 130-5 may belong to coverage of the second base station 110-2. The fifth base station 120-2, the fourth user equipment 130-4, the fifth user equipment 130-5 and the sixth user equipment 130-6 may belong to coverage of the third base station 110-3. The first user equipment 130-1 may belong to coverage of the fourth base station 120-1. The sixth user equipment 130-6 may belong to coverage of the fifth base station 120-2.

In this case, each of the plurality of base stations 110-1, 110-2, 110-3, 120-1, and 120-2 may be denoted as a nodeB, an evolved NodeB, a next generation Node B, a gNB, a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, etc. Each of the plurality of the user equipments 130-1, 130-2, 130-3, 130-4, 130-5, and 130-6 may be denoted as a user equipment, an access user equipment, a mobile user equipment, a station, a subscriber station, a mobile station, a portable subscriber station, a node, a device, etc.

Each of the plurality of communication nodes 110-1, 110-2, 110-3, 120-1, 120-2, 130-1, 130-2, 130-3, 130-4, 130-5, and 130-6 may support long term evolution (LTE), LTE-advanced (A), a new radio (NR), etc. regulated in the cellular communication (e.g., $3^{rd}$ generation partnership project (3GPP) standard. The plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected through an ideal backhaul or a non-ideal backhaul, and may exchange information through the ideal backhaul or the non-ideal backhaul. The plurality of base stations 110-1, 110-2, 110-3, 120-1, and 120-2 may be connected to a core network (not illustrated) through the ideal backhaul or the non-ideal backhaul. Each of the plurality of base stations 110-1, 110-2, 110-3, 120-1, and 120-2 may transmit a signal, received from the core network, to a corresponding user equipment 130-1, 130-2, 130-3, 130-4, 130-5, 130-6, and may transmit, to the core network, a signal received from a corresponding user equipment 130-1, 130-2, 130-3, 130-4, 130-5, 130-6.

Each of the plurality of base stations 110-1, 110-2, 110-3, 120-1, and 120-2 may support OFDMA-based downlink transmission and support SC-FDMA-based uplink transmission. Furthermore, each of the plurality of base stations 110-1, 110-2, 110-3, 120-1, and 120-2 may support multiple input multiple output (MIMO) transmission (e.g., single user (SU)-MIMO, multi user (MU)-MIMO, and massive MIMO), coordinated multipoint transmission (CoMP), carrier aggregation transmission, transmission in an unlicensed band, device to device (D2D) communication (or proximity services (ProSe)), etc. In this case, each of the plurality of the user equipments 130-1, 130-2, 130-3, 130-4, 130-5, and 130-6 may perform an operation corresponding to the base station 110-1, 110-2, 110-3, 120-1, 120-2 and/or an operation supported by the base station 110-1, 110-2, 110-3, 120-1, 120-2.

For example, the second base station 110-2 may transmit a signal to the fourth user equipment 130-4 based on the SU-MIMO method. The fourth user equipment 130-4 may receive a signal from the second base station 110-2 based on the SU-MIMO method. Or, the second base station 110-2 may transmit a signal to the fourth user equipment 130-4 and the fifth user equipment 130-5 based on the MU-MIMO method. Each of the fourth user equipment 130-4 and the fifth user equipment 130-5 may receive a signal from the second base station 110-2 based on the MU-MIMO method. Each of the first base station 110-1, the second base station 110-2 and the third base station 110-3 may transmit a signal to the fourth user equipment 130-4 based on the CoMP method. The fourth user equipment 130-4 may receive a signal from the first base station 110-1, the second base station 110-2 and the third base station 110-3 based on the CoMP method. Each of the plurality of base stations 110-1, 110-2, 110-3, 120-1, and 120-2 may transmit and receive signals to and from the user equipments 130-1, 130-2, 130-3, 130-4, 130-5, and 130-6, belonging to its own coverage, based on the CA method.

Each of the first base station 110-1, the second base station 110-2 and the third base station 110-3 may coordinate D2D communication between the fourth user equipment 130-4 and the fifth user equipment 130-5. Each of the fourth user equipment 130-4 and the fifth user equipment 130-5 may perform D2D communication through the coordination of each of the second base station 110-2 and the third base station 110-3.

Hereinafter, if a method (e.g., the transmission or reception of a signal) performed by a first communication node of communication nodes is described, a second communication node corresponding to the first communication node may perform a method (e.g., the reception or transmission of a signal) corresponding to the method performed by the first communication node. That is, if an operation of a user equipment is described, a base station corresponding to the user equipment may perform an operation corresponding to the operation of the user equipment. In contrast, if an operation of a base station is described, a user equipment corresponding to the base station may perform an operation corresponding to the operation of the base station.

Furthermore, hereinafter, downlink (DL) means communication from a base station to a user equipment. Uplink (UL) means communication from a user equipment to a base station. In the downlink, a transmitter may be part of a base station, and a receiver may be part of a user equipment. In the uplink, a transmitter may be part of a user equipment, and a receiver may be part of a base station.

Recently, as the supply of smartphones and Internet of Things (IoT) user equipments is rapidly spread, the amount of information exchanged over a communication network is increased. Accordingly, in a next-generation radio access technology, an environment (e.g., enhanced mobile broadband communication) in which faster services are provided to more users, compared to the existing communication system (or existing radio access technology), needs to be considered. To this end, the design of a communication system in which machine type communication (MCT) for providing services by connecting multiple devices and objects is considered is discussed. Furthermore, the design of a communication system (e.g., ultra-reliable and low latency communication (URLLC)) in which services sensitive to the reliability and/or latency of communication and/or a terminal, etc. is also discussed.

Hereinafter, in this specification, for convenience of description, the next-generation radio access technology is denoted as a new radio access technology (RAT). A wireless communication system to which the new RAT is applied is denoted as a new radio (NR) system.

Figure 2:
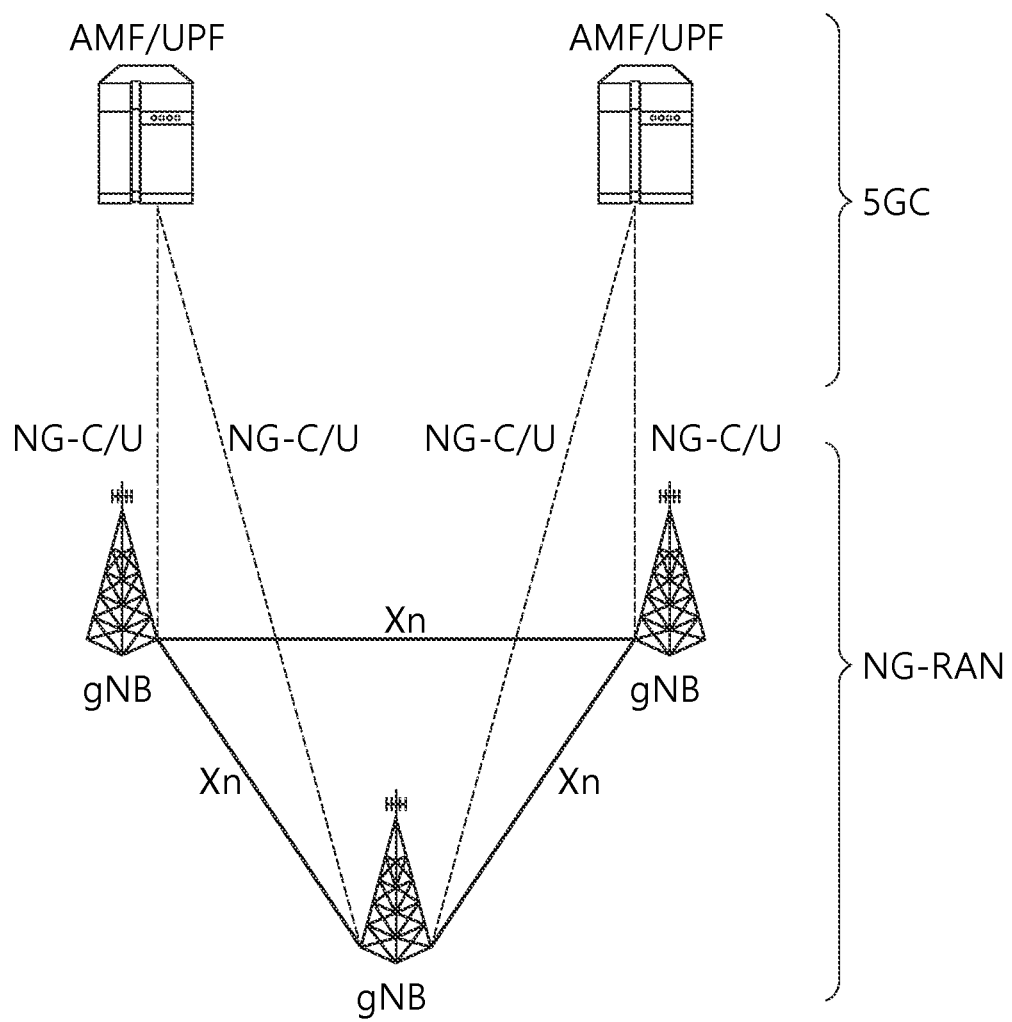
FIG. 2 is an exemplary diagram illustrating an NR system to which a data transmission method according to an embodiment of the present disclosure may be applied.

FIG. 2 is an exemplary diagram illustrating an NR system to which a data transmission method according to an embodiment of the present disclosure may be applied.

Referring to FIG. 2, a next generation-radio access network (NG-RAN) is configured with gNBs that provide an NG-RA user plane (new AS sublayer/PDCP/RLC/MAC/PHY) and a control plane (RRC) protocol end for a user equipment (UE). In this case, an NG-C indicates a control plane interface used for an NG2 reference point between the NG-RAN and a 5 generation core (5GC). An NG-U indicates a user plane interface used for an NG3 reference point between the NG-RAN and the 5GC.

The gNBs are interconnected through an Xn interface and connected to the 5GC through an NG interface. More specifically, the gNB is connected to an access and mobility management function (AMF) through an NG-C interface and connected to a user plane function (UPF) through an NG-U interface.

In the NR system of FIG. 2, multiple numerologies may be supported. In this case, the numerology may be defined by a subcarrier spacing and cyclic prefix (CP) overhead. In this case, multiple subcarrier spacings may be derived by scaling a default subcarrier spacing using an integer. Furthermore, assuming that a very low subcarrier spacing is not used in a very high carrier frequency, a numerology used may be selected independently of a frequency band.

Furthermore, in the NR system, various frame structures according to multiple numerologies may be supported. Hereinafter, OFDM numerologies and frame structures used in a data transmission method according to an embodiment of the present disclosure are described with reference to FIG. 3.

Figure 3:
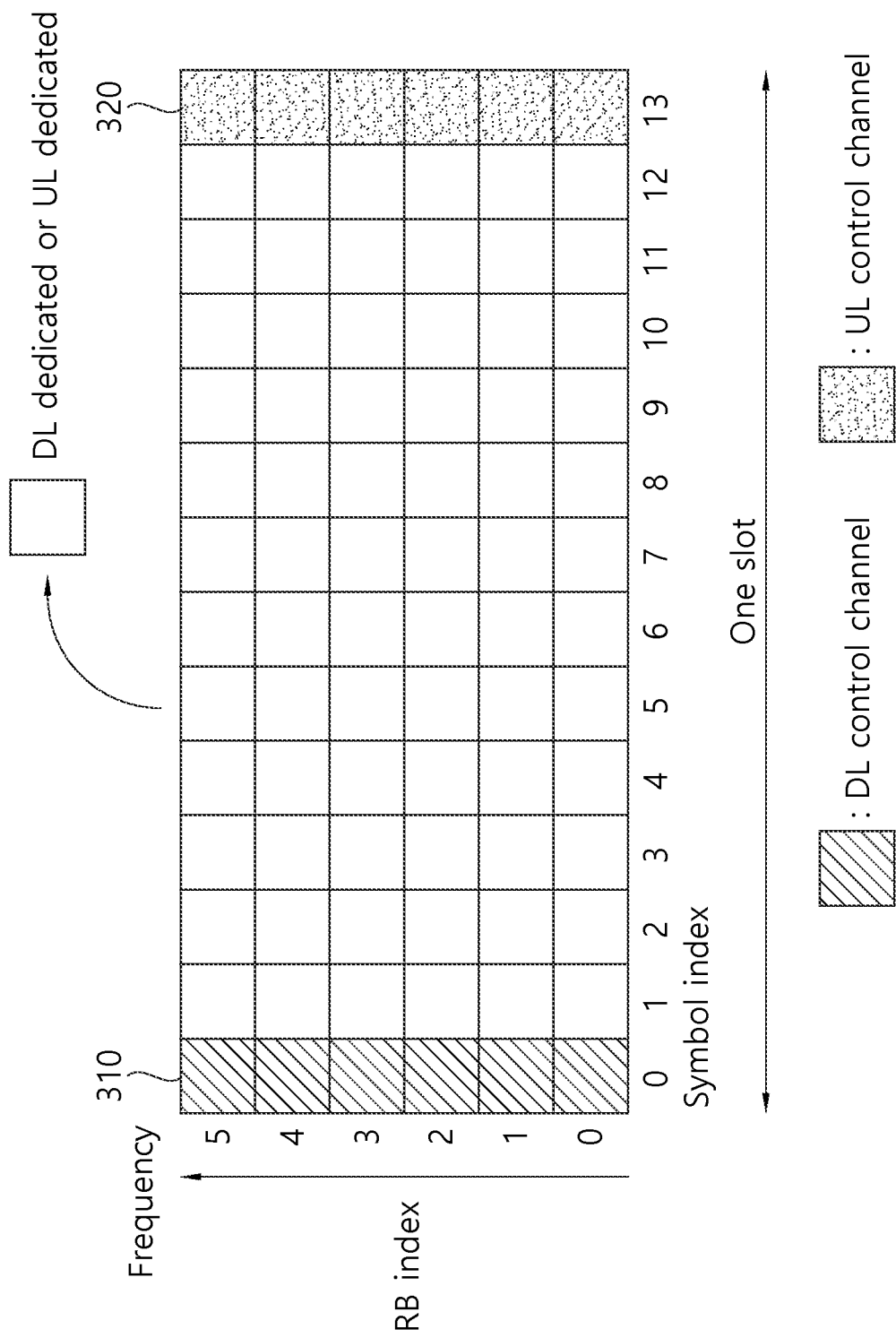
FIG. 3 is a diagram illustrating a slot structure used in a data transmission method according to an embodiment of the present disclosure.

FIG. 3 is a diagram illustrating a slot structure used in a data transmission method according to an embodiment of the present disclosure.

A time division duplexing (TDD) structure considered in the NR system is a structure in which both uplink (UL) and downlink (DL) are processed in one slot (or subframe). This is for minimizing latency of data transmission in a TDD system, and may be called a self-contained structure or a self-contained slot.

Referring to FIG. 3, one slot may be configured with 14 OFDM symbols. In FIG. 3, a region 310 indicates a downlink control region, and a region 320 indicates an uplink control region. A region (i.e., a region not having a separate indication) except the region 310 and the region 320 may be used for the transmission of downlink data or uplink data. That is, uplink control information and downlink control information may be transmitted in one slot. In contrast, in the case of data, uplink data or downlink data may be transmitted in one slot.

If the structure illustrated in FIG. 3 is used, downlink transmission and uplink transmission may be sequentially performed and the transmission of downlink data and the reception of uplink ACK/NACK may be performed within one slot. Accordingly, when an error occurs in data transmission, the time taken up to the retransmission of the data can be reduced. Accordingly, latency related to the data transmission can be minimized.

In a slot structure, such as FIG. 3, there is a need for a time lag for a process for a base station and/or a user equipment to change its mode from a transmission mode to a reception mode or for the base station and/or the user equipment to change its mode from the reception mode to the transmission mode. In relation to the time lag, if uplink transmission is performed after downlink transmission in a slot, some OFDM symbol(s) may be configured as a guard period (GP).

Figure 4:
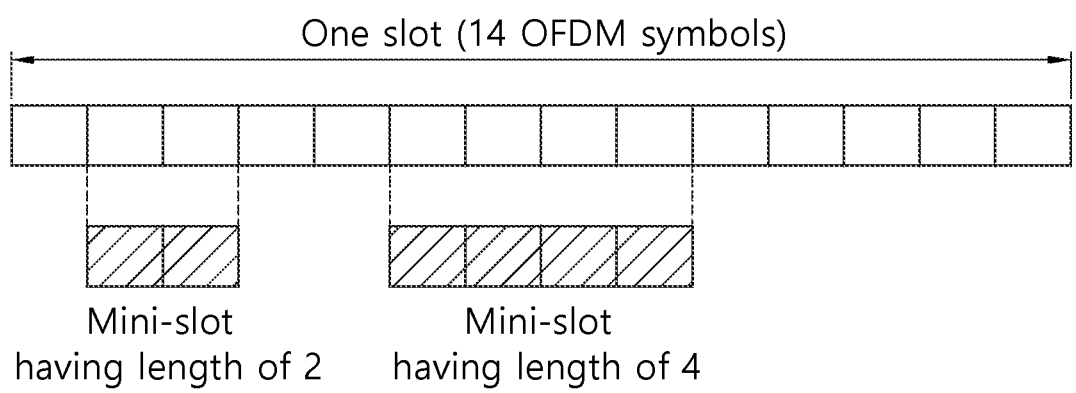
FIG. 4 is a diagram for describing a mini-slot used in a data transmission method according to an embodiment of the present disclosure.

FIG. 4 is a diagram for describing a mini-slot used in a data transmission method according to an embodiment of the present disclosure.

According to an embodiment of the present disclosure, for efficient support for URLLC, mini-slot unit scheduling may be supported in addition to the scheduling of a slot unit. The mini-slot is a minimum scheduling unit by a base station, and may be configured with 2, 4 or 7 OFDM symbols, for example.

As illustrated in FIG. 4, a mini-slot may start even in any OFDM symbol within a slot. FIG. 4 illustrates two mini-slots having different lengths (the number of OFDM symbols) within one slot, but this is merely for description. If a plurality of mini-slots is included within one slot, the number of OFDM symbols constituting each of the mini-slots may be the same.

In the NR system, for communication of various application fields corresponding to vehicle to everything (V2X), URLLC scenario, etc., data to be transmitted needs to be transmitted stably and rapidly with almost no error in the data. In particular, if a user equipment moves to a poorer channel in an environment in which the user equipment rapidly moves, if a base station configures a transport format based on a CQI fed back from the corresponding user equipment to the base station and transmits data, an error may occur. Accordingly, there is a good possibility that a situation in which retransmission has to be performed may occur. If normal data, such as enhanced mobile broad band (eMBB) data, is transmitted, there is no great problem although the normal data is retransmitted. In the case of URLLC data, if retransmission occurs, a problem may occur due to latency attributable to the retransmission. In the V2X scenario, the URLLC scenario, etc., in most cases, to use some additional resource may not be a great burden because the amount of transmitted user data is not great. However, an error occurs, and a situation in which latency is increased due to retransmission may become worse. Accordingly, in the present disclosure, data may be transmitted using the following method. A data transmission method according to the present disclosure may be applied to various scenarios of URLLC in addition to vehicle communication for V2X, etc.

Figure 5:
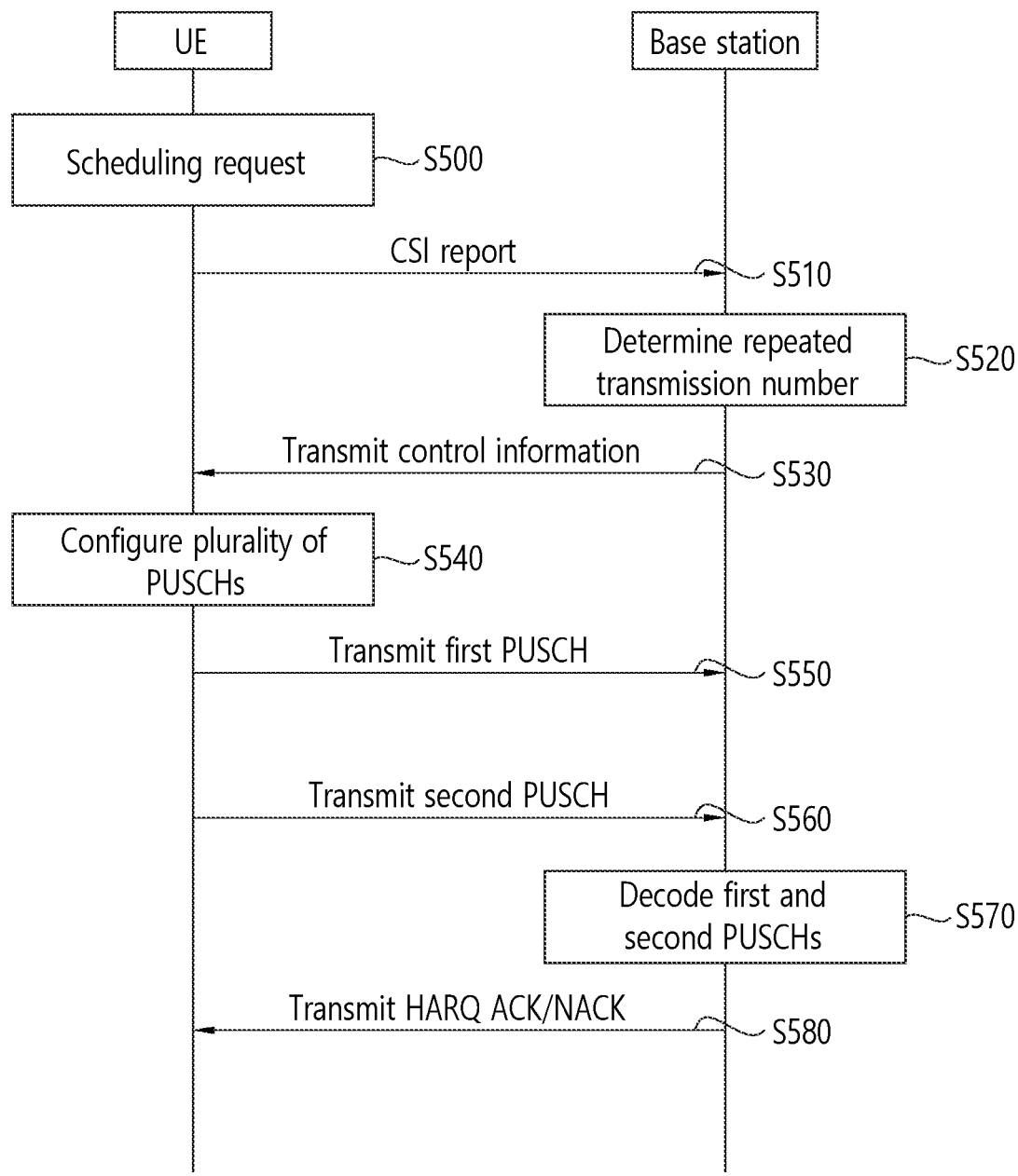
FIG. 5 is a flowchart illustrating a physical uplink shared channel (PUSCH) transmission method according to a first embodiment of the present disclosure.

FIG. 5 is a flowchart illustrating a physical uplink shared channel (PUSCH) transmission method according to a first embodiment of the present disclosure.

The first embodiment may be applied to an UL scheduling grant transmission method, for example. Referring to FIG. 5, if uplink data is present, a user equipment may perform a scheduling request (SR) on a base station (S500). Furthermore, the user equipment may measure a current channel state, and may transmit a channel quality indicator (CQI) report to the base station based on the measured state (S510). In this case, the uplink data may be URLLC data.

The base station may determine the repeated transmission number of uplink data, information on a time/frequency resource to be used upon repeated transmission, a transport format, etc. based on channel state information obtained through the CQI report received from the user equipment and information on an application service (or application, etc.) related to the uplink data (S520). Thereafter, the base station may configure control information, including the repeated transmission number of uplink data, the information on the time/frequency resource to be used upon repeated transmission, the information on the transport format, etc., and may transmit the control information to the user equipment (S530). In this case, the control information may be transmitted through high layer signaling, such as radio resource control (RRC) signaling, or may be transmitted to the user equipment through downlink control information (DCI). If the control information is transmitted to the user equipment through the DCI, a new DCI format may be used. The new DCI format may include information on a modulation and coding scheme (MCS) applied to each transmission upon repeated transmission, information on a time resource and/or a frequency resource, etc. In this case, the repeated transmission may mean that the same data is repeatedly transmitted for the stable transmission of the data. In a level of a logical channel, the same data may mean the same transport block (TB). Or, in a physical channel level, the same data may mean one codeword or one PUSCH.

Meanwhile, although not illustrated in FIG. 5, the base station may previously transmit information on a configuration for activating or deactivating repeated transmission to the user equipment. The information on the configuration for activating or deactivating the repeated transmission may be transmitted to the user equipment through high layer signaling, such as RRC signaling, or may be transmitted to the user equipment through signaling (i.e., downlink control information (DCI)) of a physical layer.

The user equipment may configure a plurality of physical uplink shared channels (PUSCH), corresponding to the repeated transmission number indicated by the base station, based on the control information (S540). In this case, the same uplink data may be mapped to the plurality of PUSCHs. Thereafter, the user equipment may transmit the plurality of PUSCHs sequentially or simultaneously using the frequency and/or time resource, allocated by the base station, based on the slot structure of FIG. 3.

FIG. 5 illustrates a case where the same uplink data is repeatedly transmitted twice, for example. In this case, the user equipment may first transmit a first PUSCH using a first frequency resource (S550). Furthermore, the user equipment may transmit a second PUSCH using a second frequency resource (S560). When receiving the first PUSCH and the second PUSCH, the base station may sequentially decode the first PUSCH and the second PUSCH (S570). In this case, the first PUSCH and the second PUSCH may be transmitted within one slot. Furthermore, the first frequency resource for the transmission of the first PUSCH and the second frequency resource for the transmission of the second PUSCH may be differently changed within one slot. As described above, a method for a user equipment to transmit uplink data while changing a frequency resource may be defined as frequency hopping (FH). Information on the first frequency resource and the second frequency resource may be indicated by at least one of radio resource control (RRC) signaling and downlink control information (DCI) by the base station. The one slot may include a first mini-slot configured with at least one OFDM symbol and a second mini-slot configured with at least one OFDM symbol. In this case, the first PUSCH may be transmitted through the first mini-slot, and the second PUSCH may be transmitted through the second mini-slot. Information on the first mini-slot and the second mini-slot for the repeated transmission of the PUSCH may also be indicated by at least one of RRC signaling and DCI. If the user equipment cannot transmit both the first PUSCH and the second PUSCH through one slot due to a case where the amount of data to be transmitted is much, the repeated transmission number is great, or a resource is insufficient, the first PUSCH may be transmitted through a first slot, and the second PUSCH may be sequentially transmitted through a second slot, that is, a slot subsequent to the first slot. Furthermore, the user equipment may transmit the first PUSCH and the second PUSCH using different frequency resources at the same time. In this case, the first PUSCH and the second PUSCH may be simultaneously transmitted from the user equipment to the base station through one slot or one mini-slot. Furthermore, the user equipment may transmit the first PUSCH and the second PUSCH using the same frequency resource at different times. In this case, the first PUSCH and the second PUSCH may be sequentially transmitted through different slots or mini-slots.

For example, the range of an FH frequency may be greatly different depending on the size of a bandwidth part (BWP). In this case, in order to maximize a frequency diversity effect, a frequency resource corresponding to the end of the BWP may be used for the FH. If many frequency resources (resource blocks (RB)) are used, several RBs may be used by increasing the number of RBs from the end of the BWP.

Meanwhile, if URLLC traffic to which the FH is applied is much, a collision should not occur between frequency resources. If the FH is applied, a frequency resource at the end of the BWP may be basically used, but may be changed if necessary. Information related to the change may be semi-statically configured through high layer RRC signaling, etc., and a user equipment may be notified of the information. In this case, in order to reduce complexity, the FH may not be performed within one mini-slot. If several mini-slots are used in order to transmit the same data, the FH may be applied. However, if channel information (channel gain for each frequency (channel gain, etc.) is reliable, the FH is not applied, and a frequency resource having a good channel state may be allocated and data may be repeatedly transmitted. For example, if a channel state is good based on a CQI value, the FH may not be applied. If a channel state is not good based on a CQI value, the FH may be applied. If channel information cannot be aware or is unreliable, the FH may be applied.

Whether to apply the FH may be notified through DCI. That is, control information for transmitting and receiving such a transmission method may be included in the DCI, and a user equipment may be notified of the control information. In this case, a new field may be added to the DCI.

If repeated transmission occurs in several slots, a frequency different from a frequency used in a previous slot may be used in a next slot. That is, the FH may be applied between the slots.

A user equipment may be notified of the length of a mini-slot and a repeated transmission number through DCI. However, the repeated transmission number may be previously notified and set through RRC. For example, if a default repeated transmission number is notified through RRC and the default repeated transmission number needs to be changed, actual repeated transmission number may be notified through DCI. In this case, information on a difference between the default repeated transmission number and the actual repeated transmission number may be included in the DCI.

Meanwhile, if a BWP overlaps between several user equipments and frequency resources overlap when the FH is used, a different FH pattern may be used between the user equipments. Furthermore, an FH range may be adjusted. For example, if frequency resources at ends on both sides of a BWP are used by a specific user equipment, a user equipment may use an RB that uses a frequency therein.

If the FH is used, a separate DM-RS may be applied to each repeated transmission. If repeated transmission is performed using the same frequency resource, a DM-RS may not be separately used. That is, repeated transmission may be performed using one DM-RS. However, if a channel is rapidly changed, a DM-RS may be separately used although the same frequency resource is used.

The number of DM-RSs used upon repeated transmission may be differently applied depending on a service or the QoS of the service. For example, upon high-speed movement, a DM-RS may be separately applied for each repetition. Upon slow movement, a DM-RS may be repetitively transmitted several times.

Meanwhile, very important information may be redundantly transmitted in a frequency domain and time domain as the same information. For example, several frequency resources may be allocated, and the same information may be transmitted in the frequency resources several times. This method may be more suitable for a mm-Wave environment in which frequency resources are many and a time resource is short. Or, several time resources may be allocated, the same information may be transmitted in the time resources several times. Or, the same information may be transmitted several times using different frequency and time resources.

If at least one of the first PUSCH and the second PUSCH is successfully decoded, the base station may transmit hybrid automatic retransmission request-acknowledge (HARQ ACK) to the user equipment (S580). In this case, the base station may not transmit the HARQ ACK/NACK for all of the plurality of PUSCHs. In other words, the base station may transmit the HARQ ACK/NACK for only some of the plurality of PUSCHs. For example, in FIG. 5, if the base station decodes the first PUSCH and checks that an error has occurred, the base station does not transmit the HARQ NACK to the user equipment, and may then decode the second PUSCH. If the second PUSCH is successfully decoded, the base station may transmit the HARQ ACK. However, if an error occurs even in the second PUSCH, the base station may transmit the HARQ NACK. That is, the base station may transmit one HARQ ACK or one HARQ NACK for the first PUSCH and the second PUSCH. The one HARQ ACK may be ACK for a PUSCH that has been first successfully decoded, among the plurality of PUSCHs. The one HARQ NACK may be NACK for all of the plurality of PUSCHs.

Meanwhile, an MCS having a level than that of the first PUSCH may be applied to the second PUSCH. In this case, the user equipment may transmit data using a transport format more stable (lower modulation and channel coding rate) than the transport format by the CQI. To this end, for example, the base station may determine an offset value between MCSs applied to the first PUSCH and the second PUSCH, may transmit data to the user equipment using a transport format using the original CQI value along with the offset value through the control information, and may indicate that data should be transmitted using the more stable transport format. In this case, in the case of normal data transmission, the user equipment may configure a transport format based on an MCS or an MCS based on the CQI, may transmit the first PUSCH using the corresponding format, and may transmit the second PUSCH using a format more stable than the transport format that was first transmitted, based on the MCS offset by considering a situation in which retransmission will occur due to an error.

In the existing communication system, if a transmitter transmits single data, only information on one transport format is included in DCI, that is, corresponding control information. However, according to the present disclosure, in order to repeatedly transmit single data, information on two types of transport formats or more may be included in DCI. Accordingly, for rapid and stable data transmission, the base station may transmit, to the user equipment, information indicating that data may be repeatedly transmitted through the two types of transport formats or more in one DCI, through RRC signaling. To this end, the base station may transmit information on a configuration for activating or deactivating the repeated transmission to the user equipment through high layer signaling, such as RRC signaling.

Meanwhile, if single data is repeatedly transmitted, a repeated transmission number may be basically 2. However, more repeated transmissions may be additionally performed depending on a channel state and/or an application service (or application). That is, a transmitter may determine a continuous transmission number and an MSC offset (a value that changes an MCS in second, third transmission compared to a first transmitted MCS) based on a channel state or an application service (or application), and may notify a receiver of the continuous transmission number and MSC offset. To this end, a new DCI format is used.

DCI formats used in the NR system to which the present disclosure is applied are the same as Table 1.

TABLE 1

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Referring to Table 1, in the case of a PUSCH, a base station transmits control information to a user equipment using the DCI format 0_0 or the DCI format 0_1. In the case of a physical downlink shared channel (PDSCH), the base station transmits control information to the user equipment using the DCI format 1_0 or DCI format 1_1.

The DCI format 0_0 is the same as Table 2, and the DCI format 0_1 is the same as Table 3.

TABLE 2

| Field | Bits | Usage |
| --- | --- | --- |
| Identifier for DCI formats | 1 | 0 is set for UL DCI |
| Frequency domain resource assignment | N | Frequency Domain Location of assigned RBs |
| Time domain resource assignment | 4 | PUSH Allocation in time domain |
| Frequency hopping flag | 1 | |
| Modulation and coding scheme | 5 | |
| New data indicator | 1 | |
| Redundancy version | 2 | |
| HARQ process number | 4 | |
| TPC command for scheduled PUSCH | 2 | |

TABLE 2-continued

| Field | Bits | Usage |
|---|---|---|
| UL/SUL indicator | 0 or 1 | 0: non-supplementary uplink 1: supplementary uplink |

TABLE 3

| Field | Bits | Usage |
|---|---|---|
| Identifier for DCI formats | 1 | 0 is set for UL DCI |
| Carrier indicator | 0 or 3 | |
| UL/SUL indicator | 0 or 1 | 1 bit if UE is configured with SUL, 0 otherwise |
| Bandwidth part indicator | 0, 1, or 2 | |
| Frequency domain resource assignment | Variable | |
| Time domain resource assignment | 0, 1, 2, 3, or 4 | |
| Frequency hopping flag | 0 or 1 | 0 when frequency hopping not enabled, else 1 |
| Modulation and coding scheme | 5 | |
| New data indicator | 1 | |
| Redundancy version | 2 | |
| HARQ process number | 4 | |
| $1^{st}$ downlink assignment index | 1 or 2 | |
| $2^{nd}$ downlink assignment index | 0 or 2 | |
| TPC command for scheduled PUSCH | 2 | |
| SRS resource indicator | Variable | |
| Precoding information and number of layers | Variable | |
| Antenna ports | Variable | |
| CSI request | 0, 1, 2, 3, 4, 5, or 6 | |
| CBG transmission information | 0, 2, 4, 6, or 8 | Determined by higher layer parameter maxCodeBlockGroupsPerTransportBlock |
| PTRS-DMRS association | Variable | |
| Beta_offset indicator | 0 or 2 | 0 if betaOffset = semestatic, 2 otherwise |
| DMRS sequence initialization | 0 or 1 | 0 bit if the higher layer parameter transform precoder is enabled 1 bit if he higher layer parameter transform precoder is disenabled |
| UL-SUH indicator | 1 | |

Referring to Table 2 and Table 3, a field indicative of an MCS is 5 bits in the DCI format 0_0 and the DCI format 0_1, that is, control information for a PUSCH. This means that one of 32 MCS indices of the MCS index table is selected and transmitted to a user equipment.

Meanwhile, the DCI format 1_0 is the same as Table 4, and the DCI format 1_1 is the same as Table 5.

TABLE 4

| Field | Bits | Usage |
|---|---|---|
| Identifier for DCI formats | 1 | Value as 1, indication of DL DCI |
| Frequency domain resource assignment | N | |
| Time domain resource assignment | 4 | |
| VRB-to-BRB mapping | 1 | |
| Modulation and coding scheme | 5 | |
| New data indicator | 1 | |
| Redundancy version | 2 | |
| HARQ process number | 4 | |

TABLE 4-continued

| Field | Bits | Usage |
|---|---|---|
| TPC command for scheduled PUSCH | 2 | |
| PUCCH resource indicator | 3 | |
| PDSCH-to-HARQ_feedback timing indicator | 3 | |

TABLE 5

| Field | Bits | Usage |
|---|---|---|
| Identifier for DCI formats | 1 | Value as 1, indication of DL DCI |
| Carrier indicator | 0 or 3 | |
| Bandwidth part indicator | 0, 1, or 2 | |
| Frequency domain resource assignment | Variable | Similar to DCI 1_0 field |
| Time domain resource assignment | 0, 1, 2, 3, or 4 | |
| VRB-to-PRB mapping | 0 or 1 | 0 if prb-BundingType is not configured or is set to static, 1 otherwise |
| PRB bundling size indicator | 0 or 1 | |
| Rate matching indicator | 0, 1, or 2 | |
| ZP CSI-RS trigger | 0, 1, or 2 | |
| Modulation and coding scheme [TB1] | 5 | |
| New data indicator [TB1] | 1 | |
| Redundancy version [TB1] | 2 | |
| Modulation and coding scheme [TB2] | 5 | |
| New data indicator [TB2] | 1 | |
| Redundancy version [TB2] | 2 | |
| HARQ process number | 4 | |
| Downlink assignment index | 0, 2, or 4 | |
| TPC command for scheduled PUSCH | 2 | |
| PUCCH resource indicator | 3 | |
| PDSCH-to-HARQ_feedback timing indicator | 0, 1, 2 or 3 | |
| Antenna ports | 4, 5, or 6 | |
| SRS request | 2 | |
| CBG transmission information | 0, 2, 4, 6, or 8 | |
| CGB flushing out information | 0 or 1 | |
| DMRS sequence initialization | 0 or 1 | |

Referring to Table 4 and Table 5, a field notifying an MCS has been set as 5 bits in the DCI format 1_0 and the DCI format, that is, control information for a PDSCH. As described above, only information on one MCS can be transmitted in the DCI format of Table 2 to Table 5. If single data is repeatedly transmitted, information on the number of times that single data is repeatedly transmitted, an MCS upon each transmission, and a frequency/time resource used upon each transmission cannot be transmitted. Accordingly, in the present disclosure, in order to rapidly and stably transmit data, a new DCI format different from the DCI format of Table 2 to Table 5 may be used. The new DCI format may include information on the number of times that single data is repeatedly transmitted and an MCS applied upon each transmission. The information on the MCS may include first MCS information applied upon first transmission and MCS offset information applied upon subsequent transmission. Or, the information on the MCS may include MCS information applied upon each transmission depending on a repeated transmission number. For example, if the repeated transmission number is "2", a corresponding DCI format may include first MCS information applied upon first transmission and second MCS information applied upon second transmission.

When the existing single data is transmitted based on the new DCI, an MCS for one transmission is configured and a corresponding frequency and time resource is not allocated, but a plurality of repeated transmissions may be configured and an MCS and frequency and time resources for each repeated transmission may be allocated. In this case, in the case of the second and third transmissions, an MCS and frequency and time resources may be allocated assuming that a channel is in an unstable state.

In this case, in allocating the time resource, a start and length indicator value (SLIV) may be used. The SLIV is a parameter to notify the allocation of time resources for a PDSCH and a PUSCH, and indicates that data is transmitted during L symbols from S (a starting symbol number) within one slot. The SLIV is represented as 7 bits. The SLIV may be transmitted to the user equipment through RRC signaling.

Furthermore, in allocating the frequency resource, upon each repeated transmission, that is, when the same data is transmitted several times, a frequency may be changed upon each transmission. For example, upon transmission of the first PUSCH and transmission of the second PUSCH, frequency hopping may be applied to the transmission of each PUSCH. If the first PUSCH and the second PUSCH may be transmitted through different mini-slots within one slot, a frequency allocated to each PUSCH may be changed.

As described above, if repeated transmission is performed for single data transmission, an HARQ may be process as if single data is transmitted. That is, a receiver may continuously receive the data by a corresponding transmission number and perform decoding because the receiver is aware how many times the data is transmitted for the single data transmission, and may transmit ACK with respect to a case where the first reception is correctly performed. If the decoding of all repeated transmissions is not correctly performed after reception is finally performed, the receiver may transmit NACK (or NAK) so that a transmitter performs retransmission. That is, the ACK (or NACK) may not be transmitted with respect to all of the repeated transmission. Furthermore, when data is decoded normally for the first time among a plurality of repeated transmissions, the receiver may neglect subsequently repeatedly transmitted data. Overhead of HARQ ACK/NACK accompanied by the repeated transmission of the same data can be reduced through such a method.

Figure 6:
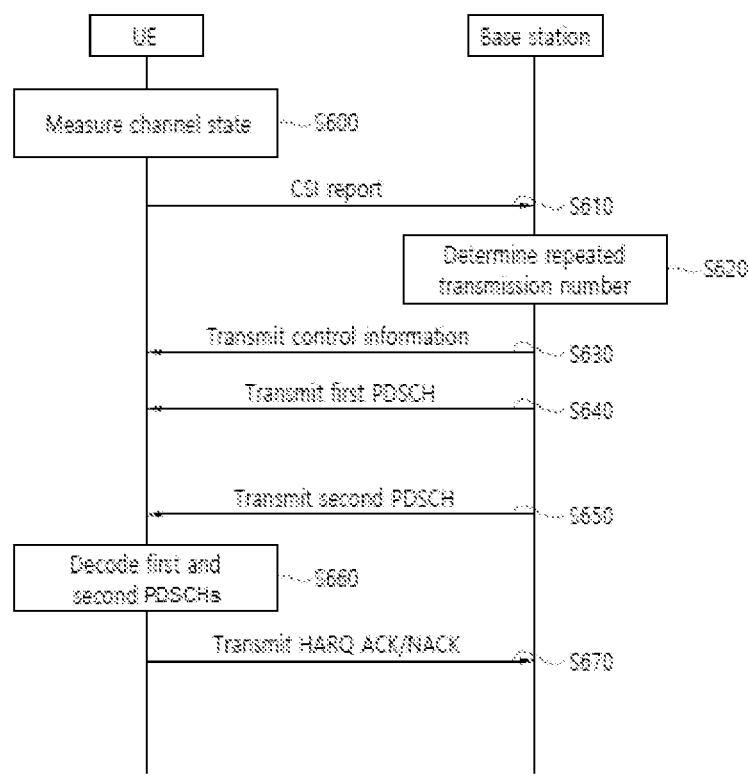
FIG. 6 is a flowchart illustrating a physical downlink shared channel (PDSCH) transmission method according to a second embodiment of the present disclosure.

FIG. 6 is a flowchart illustrating a physical downlink shared channel (PDSCH) transmission method according to a second embodiment of the present disclosure.

As the second embodiment, referring to FIG. 6, a user equipment may measure a current channel state of the user equipment (S600), may configure a CQI report based on the current channel state, and may transmit the CQI report to a base station (S610). If repeated transmission has been activated, the base station may determine the repeated transmission number of downlink data, and a time resource, a frequency resource, a transport format, etc. to be used upon repeated transmission based on the CQI report received from the user equipment (S620). In a situation in which repeated transmission has been deactivated, if it is determined that repeated transmission is necessary in order to satisfy the quality of service (QoS) of downlink data, the base station may transmit, to the user equipment, configuration information indicating that repeated transmission is activated. In this case, configuration information indicative of the activation of the repeated transmission or configuration information indicative of the deactivation of the repeated transmission may be transmitted to the user equipment through RRC signaling.

(S620). In a situation in which repeated transmission has been deactivated, if it is determined that repeated transmission is necessary in order to satisfy the quality of service (QoS) of downlink data, the base station may transmit, to the user equipment, configuration information indicating that repeated transmission is activated. In this case, configuration information indicative of the activation of the repeated transmission or configuration information indicative of the deactivation of the repeated transmission may be transmitted to the user equipment through RRC signaling.

Thereafter, the base station may transmit, to the user equipment, control information including information on the repeated transmission number, and information on the time resource, the frequency resource, the transport format, etc. to be used upon repeated transmission (S630). In the present embodiment, the control information may be DCI. The DCI may be DCI having a new format different from the DCI format of Table 2 to Table 5 as described above. The new DCI may include information on a repeated transmission number, information on an MCS applied to each repeated transmission, information on a time and/or frequency resource allocated to each repeated transmission, etc.

The base station may configure a plurality of PDSCHs corresponding to the repeated transmission number based on the control information. In this case, downlink data may be identically mapped to the plurality of PDSCHs. Furthermore, the base station may transmit the plurality of PDSCHs sequentially or simultaneously through the slot structure of FIG. 3.

For example, as illustrated in FIG. 6, in the state in which the repeated transmission number has been set to 2, when the first PDSCH and the second PDSCH are received (S640, S650), the user equipment may determine whether data has been received normally by sequentially decoding the first PDSCH and the second PDSCH (S660). In this case, if the first PDSCH is decoded normally without an error, the user equipment may not perform decoding on the second PDSCH. However, if the first PDSCH is not decoded normally, the user equipment may decode the second PDSCH. If at least one of the first PDSCH and the second PDSCH is decoded normally, the user equipment may transmit HARQ ACK to the base station (S670). However, if errors occur in both the first PDSCH and the second PDSCH, the user equipment may transmit HARQ NACK to the base station. In this case, although a plurality of PDSCHs is received from the base station, the user equipment may not transmit HARQ ACK/NACK to all of the plurality of PDSCHs. In other words, the user equipment may transmit only HARQ ACK/NACK for only some of the plurality of PDSCHs. For example, as illustrated in FIG. 6, if it is determined that an error has occurred after the first PDSCH is decoded, the user equipment does not transmit HARQ NACK to the base station, but may decode the subsequently transmitted second PDSCH. If the second PDSCH is successfully decoded, the user equipment may transmit HARQ ACK. However, if an error occurs even in the second PDSCH, the user equipment may transmit HARQ NACK. That is, the user equipment may transmit only one HARQ ACK or one HARQ NACK for the first PDSCH and the second PDSCH. The one HARQ ACK may be transmitted with respect to a PDSCH that has been successfully decoded among the plurality of PDSCHs.

As illustrated in FIG. 6, in transmitting two PDSCHs (the first PDSCH and the second PDSCH), an MCS having a level lower than that of the first PDSCH may be applied to the second PDSCH. That is, the first PDSCH and the second PDSCH may have different transport formats. Furthermore, the first PDSCH may be transmitted through a first mini-slot within one slot, and the second PDSCH may be transmitted through a second mini-slot within the one slot. In this case, a first frequency resource for the transmission of the first PDSCH and a second frequency resource for the transmission of the second PDSCH may be different. In other words, the PDSCH is repeatedly transmitted in the form of a mini-slot, but frequency hopping may be applied to the repeated transmission. If the base station cannot transmit both the first PDSCH and the second PDSCH to the user equipment through one slot due to a case where the amount of data to be transmitted is much, the repeated transmission number is many, or a resource is insufficient, the base station may transmit the first PDSCH through a first slot and sequentially transmit the second PDSCH through a second slot, that is, a slot subsequent to the first slot. Furthermore, the base station may transmit the first PDSCH and the second PDSCH using different frequency resources at the same time. In this case, the first PDSCH and the second PDSCH may be simultaneously transmitted to the user equipment through one slot or one mini-slot.

Figure 7:
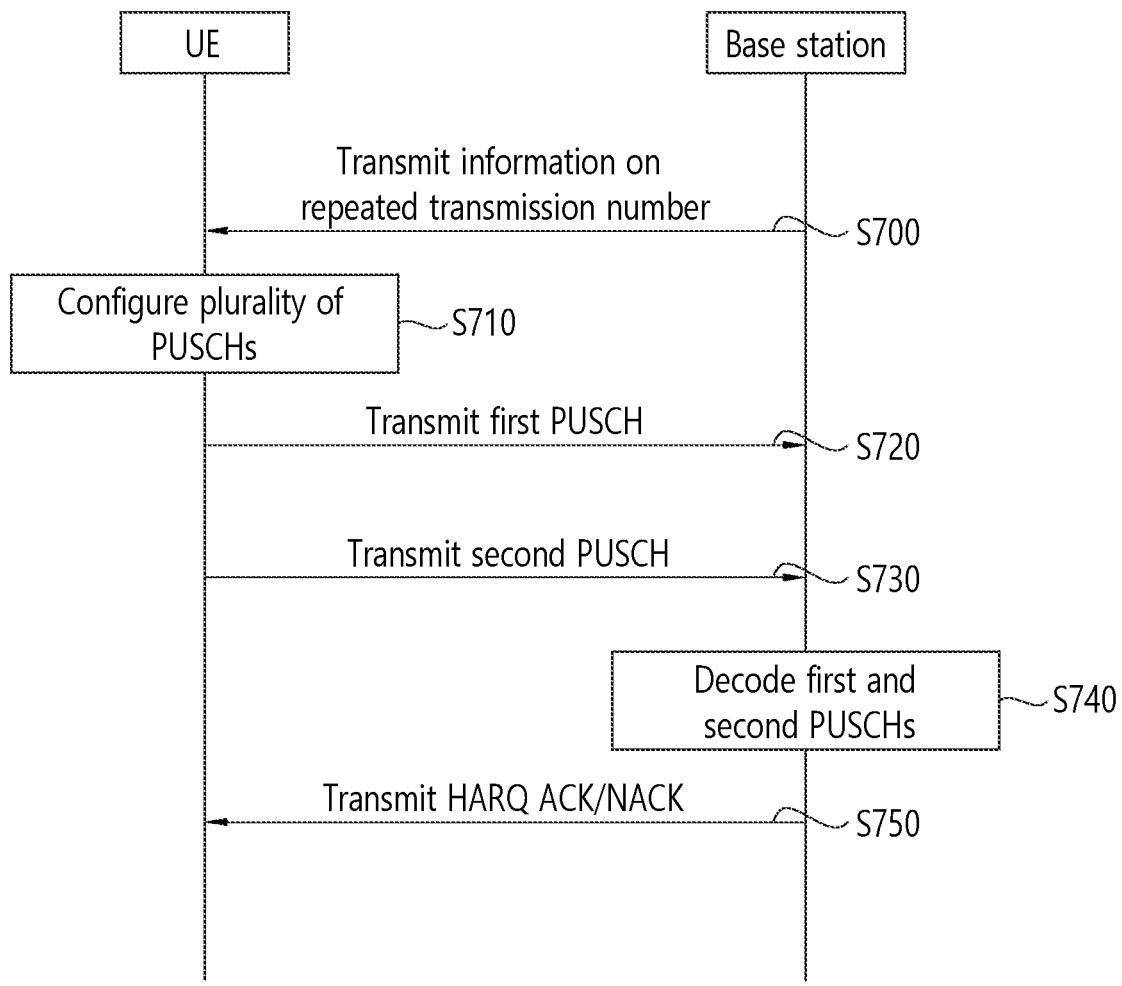
FIG. 7 is a flowchart illustrating a PUSCH transmission method according to a third embodiment of the present disclosure.

FIG. 7 is a flowchart illustrating a PUSCH transmission method according to a third embodiment of the present disclosure.

For example, the third embodiment may be applied to an UL grant free transmission method. Although the UL grant free transmission method is used, configuration information indicative of the activation or deactivation of repeated transmission may be transmitted to a user equipment through RRC signaling. Furthermore, the user equipment may be previously notified of information on the repeated transmission number of a PUSCH, information on an MCS applied to each repeated transmission, information on the allocation of a time and/or frequency resource to be used upon each repeated transmission, transmission period information, etc. through RRC signaling.

Referring to FIG. 7, in the UL grant free transmission method, when receiving, from a base station, the repeated transmission number of uplink data, information on a time/frequency resource to be used upon repeated transmission, information on a transport format, etc. (S700), a user equipment may configure a plurality of PUSCHs based on the information (S710). In this case, the uplink data may be identically mapped to the plurality of PUSCHs.

As illustrated in FIG. 7, if two PUSCHs are transmitted with respect to one uplink data, the user equipment may first transmit a first PUSCH using a first frequency resource (S720), and may transmit a second PUSCH using a second frequency resource (S730). In this case, the first PUSCH and the second PUSCH may be simultaneously transmitted to the same time or may be sequentially transmitted through different slots or mini-slots.

The base station may determine whether data has been received without an error by sequentially decoding the first PUSCH and the second PUSCH (S740). If the first PUSCH is not successfully decoded, the base station may perform decoding on the second PUSCH. If at least one of the first PUSCH and the second PUSCH is successfully decoded, the base station may transmit HARQ ACK (S750). In this case, the base station may not transmit HARQ ACK/NACK for all of the plurality of PUSCHs. That is, the base station does not transmit HARQ ACK/NACK for all of the plurality of PUSCHs, but may transmit only HARQ ACK/NACK for some of the PUSCHs.

Meanwhile, if the user equipment transmits a plurality of PUSCHs with respect to single data, it may transmit each of the PUSCHs through a different mini-slot within one slot. In this case, the user equipment may transmit each of the PUSCH using a different frequency resource or may transmit the PUSCHs using the same frequency resource. Furthermore, the user equipment may apply an MCS, having a level lower than that of a PUSCH transmitted at an (N−1)-th place, to a PUSCH transmitted at an N-th place.

Figure 8:
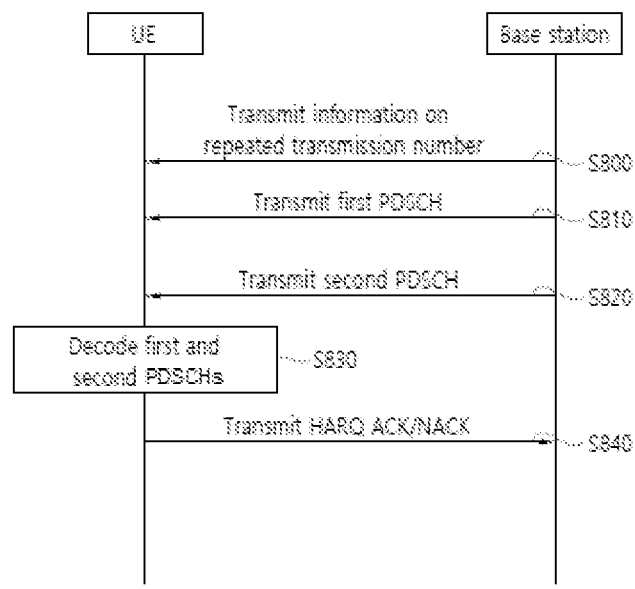
FIG. 8 is a flowchart illustrating a PDSCH transmission method according to a fourth embodiment of the present disclosure.

FIG. 8 is a flowchart illustrating a PDSCH transmission method according to a fourth embodiment of the present disclosure.

As the fourth embodiment, referring to FIG. 8, a base station may transmit, to a user equipment, a time and/or frequency resource to be used upon repeated transmission, information on a transport format, etc. through RRC signaling, along with the repeated transmission number of downlink data (S800). Furthermore, the base station may transmit, to the user equipment, configuration information indicative of the activation or deactivation of repeated transmission through RRC signaling.

If downlink data to be transmitted is present, the base station may configure a plurality of PDSCHs corresponding to a repeated transmission number. In this case, the downlink data may be identically mapped to the plurality of PDSCHs. Furthermore, the base station may transmit the plurality of PDSCHs through the slot structure of FIG. 3. For example, as illustrated in FIG. 8, as the repeated transmission number is set to 2, if the base station configures the first PDSCH and the second PDSCH, the base station may transmit the first PDSCH and the second PDSCH to the user equipment simultaneously or sequentially (S810, S820). In this case, the user equipment may determine whether data has been received normally by first decoding the first PDSCH (S830). In this case, if the first PDSCH is decoded normally without an error, the user equipment may not perform decoding on the second PDSCH. However, if the first PDSCH is not decoded normally, the user equipment may decode the second PDSCH. If at least one of the first PDSCH and the second PDSCH is decoded normally, the user equipment may transmit HARQ ACK to the base station (S840). However, if errors occur in both the first PDSCH and the second PDSCH, the user equipment may transmit HARQ NACK to the base station. In this case, although the user equipment receives a plurality of PDSCHs from the base station, it may not transmit HARQ ACK/NACK for all of the plurality of PDSCHs. In other words, the user equipment may transmit only HARQ ACK/NACK for only some of the plurality of PDSCHs.

Meanwhile, in transmitting the plurality of PDSCHs, an MCS having a level lower than that of a PDSCH transmitted at an (N−1)-th place may be applied to a PDSCH transmitted at an N-th place. That is, different transport formats may be applied to the plurality of PDSCHs. Furthermore, the plurality of PDSCHs may be transmitted in the form of a mini-slot, such as that shown in FIG. 4. In this case, a different frequency resource may be used for the transmission of each of the PDSCHs. That is, the plurality of PDSCHs is transmitted in the form of a mini-slot, but frequency hopping may be applied to each of the PDSCHs.

In the aforementioned embodiment, a case where a receiver is a base station when a transmitter is a user equipment and a receiver is a user equipment when a transmitter is a base station has been described. However, in the present disclosure, both a transmitter and a receiver may correspond to a user equipment. In this case, for example, a transmission user equipment may configure a plurality of physical sidelink shared channels (PSSCH) using one sidelink data, based on a repeated transmission number, information on a time resource and/or frequency resource to be used upon repeated transmission, information on a transport format, etc. received from a base station. That is, the same sidelink data may be mapped to the plurality of PSSCHs. The plurality of PSSCHs may be simultaneously transmitted through different frequency resources or may be sequentially transmitted through different time resources. Or, the plurality of PSSCHs may be sequentially transmitted through different frequency resources and different time resources.

For example, if a transmission user equipment transmits a first PSSCH and a second PSSCH to a reception user equipment, the first PSSCH and the second PSSCH may be sequentially transmitted through a first mini-slot and a second mini-slot within one slot. In this case, the first PSSCH and the second PSSCH may be transmitted through the same frequency resource. Or, frequency hopping may be applied between the first PSSCH and the second PSSCH. That is, the first PSSCH and the second PSSCH may be transmitted through different frequency resources. Furthermore, the first PSSCH and the second PSSCH may be simultaneously transmitted through different frequency resources at the same time. In this case, the first PSSCH may be transmitted through a first mini-slot, and the second PSSCH may be transmitted through a second mini-slot. In this case, the first mini-slot and the second mini-slot may be included in one slot or may be included in different slots. The reception user equipment may transmit, to the transmission user equipment or a base station, HARQ feedback (ACK or NACK) for the first PSSCH and the second PSSCH.

For another example, a transmission user equipment may autonomously determine the repeated transmission number of the same data, a time resource and/or frequency resource to be used upon repeated transmission, a transport format, etc. without control of a base station, and may transmit corresponding information to a reception user equipment through a physical sidelink control channel (PSCCH). Furthermore, the transmission user equipment may configure a plurality of PSSCHs using one sidelink data, and may transmit the plurality of PSSCHs to the reception user equipment. In this case, the reception user equipment may transmit at least one HARQ feedback for the plurality of PSSCHs to the transmission user equipment.

Figure 9:
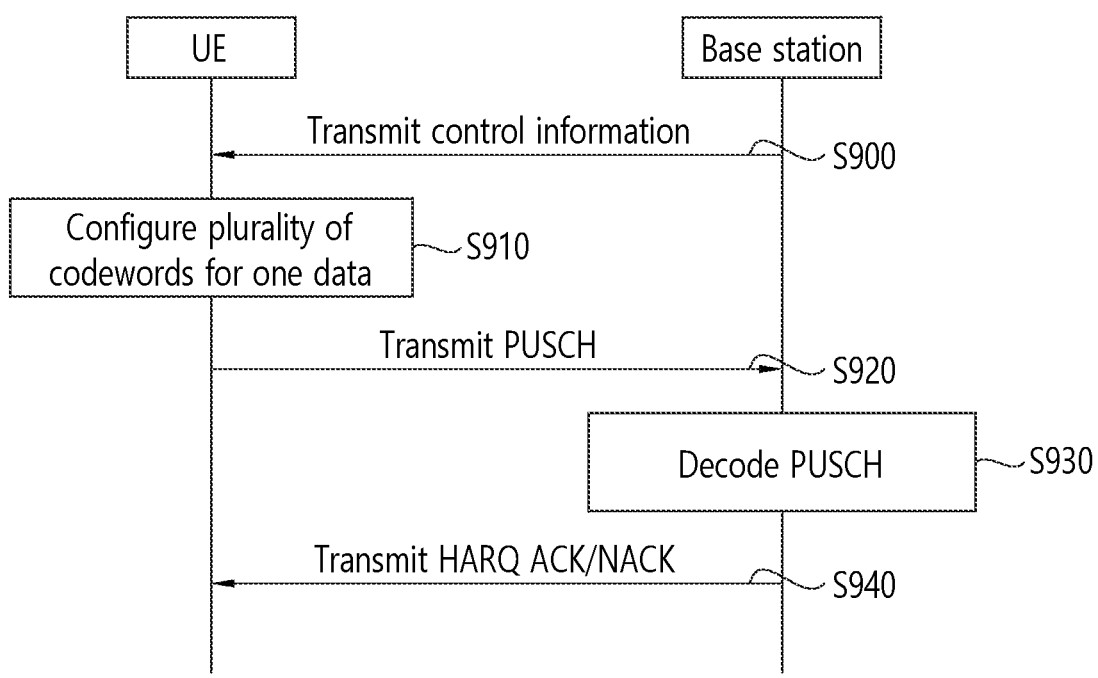
FIG. 9 is a flowchart illustrating an uplink data transmission method according to a fifth embodiment of the present disclosure.

FIG. 9 is a flowchart illustrating an uplink data transmission method according to a fifth embodiment of the present disclosure.

Referring to FIG. 9, as the fifth embodiment, a base station may determine the repeated transmission number of uplink data to be transmitted by a user equipment, a redundancy version (RV) to be applied to each repeated transmission, a time and/or frequency resource to be used for each repeated transmission, etc. Furthermore, the base station may configure control information, including information on the repeated transmission number of the uplink data, information on the redundancy version applied to each repeated transmission, information on the time and/or frequency resource to be used upon each repeated transmission, etc., and may transmit the control information to the user equipment (S900). In this case, the control information may be transmitted to the user equipment through high layer signaling, such as radio resource control (RRC) signaling, or through physical layer signaling, such as downlink control information (DCI). If the control information is transmitted to the user equipment through the DCI, a new DCI format may be used. When receiving DCI having a new DCI format through a physical downlink control channel (PDCCH), the user equipment may repetitively transmit uplink data. In this case, repeated transmission means that the same data is repeatedly transmitted for the stable transmission of the data. To this end, a plurality of codewords may be configured for single data. In this case, the user equipment may configure a plurality of redundancy versions based on information on a redundancy version received from the base station, and may apply any one of the pre-configured redundancy versions to each of the plurality of codewords. In this case, the plurality of redundancy versions may have different puncturing patterns. All of redundancy versions applied to a plurality of codewords for single data may be the same or different. A plurality of codewords for single data may be transmitted through one transport block.

Meanwhile, the base station may previously transmit information on a configuration for activating or deactivating repeated transmission to the user equipment. The information on the configuration for activating or deactivating the repeated transmission may be transmitted to the user equipment through high layer signaling, such as RRC signaling, or through physical layer signaling, such as DCI. When receiving information on the configuration for activating the repeated transmission, the user equipment may perform the repeated transmission on uplink data.

Referring back to FIG. 9, the user equipment may configure a plurality of codewords, corresponding to the repeated transmission number indicated by the base station through single data, based on control information received from the base station (S910). That is, one uplink data may be identically mapped to the plurality of codewords. Thereafter, the user equipment may apply at least one redundancy version to each of the plurality of codewords based on the control information, and may transmit, to the base station, the plurality of codewords to which the redundancy versions have been applied through at least one physical uplink shared channel (PUSCH) using a time and/or frequency resource indicated by the base station (S920). In this case, the user equipment may transmit the plurality of codewords on a frequency axis or may transmit the plurality of codewords on a time axis or may transmit the plurality of codewords on the frequency axis and the time axis. Furthermore, the user equipment may simultaneously transmit the plurality of codewords, having different redundancy versions, through different beams.

For example, the user equipment may transmit the plurality of codewords using frequency resources expected to have different channel gains. To this end, the user equipment may differently apply a mapping method between a virtual resource block (PRB) and a physical resource block (PRB) to each codeword. That is, a different VRB-to-PRB interleaving method may be applied to each codeword. In this process, a first codeword of the plurality of codewords may be localized and transmitted on the frequency axis, and a second codeword thereof may be distributed and transmitted on the frequency axis. If this method is used, a frequency diversity effect can be obtained.

For another example, the user equipment may continuously transmit the plurality of codewords on the time axis using different resources. To this end, the user equipment may configure a plurality of PUSCHs including the plurality of codewords, respectively. Furthermore, the user equipment may transmit a first PUSCH on a first slot (or mini-slot), and may transmit a second PUSCH on a second slot (or mini-slot). That is, the plurality of codewords may be transmitted through different slots (or mini-slots), respectively. If this method is used, a time diversity effect can be obtained. In this case, a first mini-slot and a second mini-slot may be included in one slot or may be included in different slots.

For still another example, the user equipment may transmit the plurality of codewords using different beams. In this case, the beam may be an analog beam or a digital beam. In this case, the base station may notify the user equipment of information indicating whether to use beamforming for repeated transmission through high layer signaling and/or physical layer signaling. If it is indicated that beamforming is used for repeated transmission, the user equipment may transmit a first codeword by forming a first beam, and may transmit a second codeword by forming a second beam. If this method is used, a spatial diversity effect can be obtained.

When receiving the plurality of codewords through at least one PUSCH, the base station may decode the plurality of codewords, and may determine whether uplink data is successfully received (S930). If at least one of the plurality of codewords is successfully decoded and it is determined that the uplink data has been successfully received, the base station may transmit hybrid automatic retransmission request-acknowledge (HARQ ACK) to the user equipment (S940). However, if the uplink data is not decoded normally, the base station may transmit HARQ negative acknowledge (NACK) to the user equipment. In this case, the base station may not transmit the HARQ feedback for all of the plurality of codewords. That is, the base station may transmit the HARQ ACK/NACK for only some of the plurality of codewords. For example, if it is checked that an error has occurred when a first codeword is decoded, the base station does not transmit HARQ NACK to the user equipment, and may immediately decode a second codeword. Furthermore, if the second codeword has been successfully decoded, the base station may transmit HARQ ACK. However, if an error has occurred even in the second codeword, the base station may combine the first codeword and the second codeword, and may correct an error occurred in at least one of the first codeword and the second codeword. If it is determined that the uplink data has been successfully received because all errors are corrected, the base station may transmit HARQ ACK. However, if it is determined that the uplink data has not been successfully received because an error is present although the plurality of codewords has been combined, the base station may transmit HARQ NACK. As described above, the base station may transmit only one HARQ ACK or one HARQ NACK for the plurality of codewords. In this case, overhead of the HARQ feedback in repeatedly transmitting the same data can be reduced. In combining the plurality of codewords, any one of a chase combining (CC) method and an incremental redundancy (IR) method may be selectively used. The CC method may be used if the same redundancy version has been applied to the plurality of codewords. The IR method may be used if different redundancy versions have been applied to the plurality of codewords.

Meanwhile, if a first codeword (firstly received codeword) of the plurality of codewords is successfully decoded, the base station may omit the decoding of a second codeword (codeword received after the first codeword). That is, if successfully received data is present in data repeatedly transmitted by the user equipment, the base station may neglect subsequently repeatedly transmitted data. In this case, unnecessary processing for the same data can be prevented.

Figure 10:
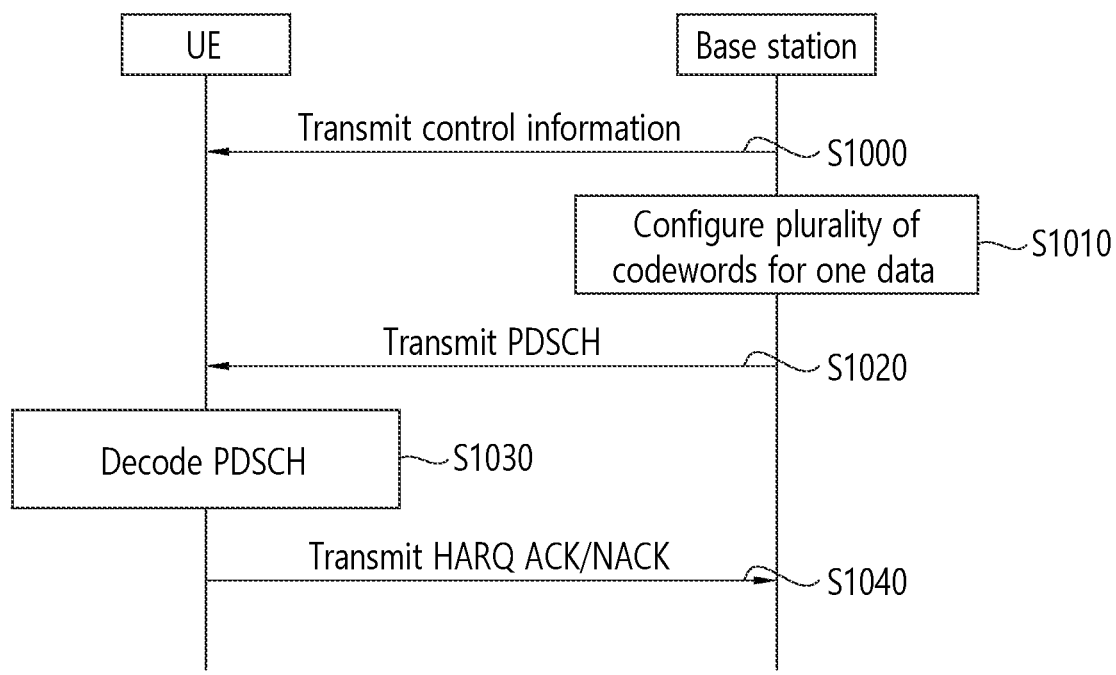
FIG. 10 is a flowchart illustrating a downlink data transmission method according to a sixth embodiment of the present disclosure.

FIG. 10 is a flowchart illustrating a downlink data transmission method according to a sixth embodiment of the present disclosure. Hereinafter, as the sixth embodiment, a case where a base station repeatedly transmits downlink data is described with reference to FIG. 10.

Referring to FIG. 10, if repeated transmission has been activated, the base station may determine the repeated transmission number of downlink data to be transmitted to a user equipment, a redundancy version to be applied to each repeated transmission, a time and/or frequency resource to be used for each repeated transmission, etc. Furthermore, the base station may configure control information, including information on the repeated transmission number of the downlink data, information on the redundancy version applied to each repeated transmission, information on the time and/or frequency resource to be used upon each repeated transmission, etc., and may transmit the control information to the user equipment (S1000). In the state in which repeated transmission has not been activated, if it is determined that repeated transmission is necessary to satisfy the quality of service (QoS) of the downlink data, the base station may transmit, to the user equipment, configuration information indicating that the repeated transmission is activated. In this case, the configuration information indicative of the activation of the repeated transmission or configuration information indicative of the deactivation of repeated transmission may be transmitted to the user equipment through RRC signaling.

Thereafter, the base station may configure a plurality of codewords corresponding to the repeated transmission number of which the user equipment has been notified (S1010). Furthermore, the base station may transmit the plurality of codewords to the user equipment through at least one physical downlink shared channel (PDSCH) (S1020). In this case, one downlink data may be identically mapped to the plurality of codewords.

For example, if the repeated transmission number is set to 2, the base station may configure a first codeword and a second codeword as one downlink data. In this case, the base station may apply the same redundancy version to both the first codeword and the second codeword or may apply a first redundancy version to the first codeword and apply a second redundancy version to the second codeword. In this case, the first redundancy version may be a version having lower redundancy than the second redundancy version. Thereafter, the base station may transmit the first codeword and the second codeword by applying a first VRB-to-PRB interleaving method to the first codeword and applying a second VRB-to-PRB interleaving method to the second codeword. In this case, the first VRB-to-PRB interleaving method is a method of mapping data so that the data is concentrated in a frequency axis. The second VRB-to-PRB interleaving method may be a method of mapping data so that the data is distributed in the frequency axis. In this case, the first codeword may be transmitted through a first beam, and the second codeword may be transmitted through a second beam.

For another example, when transmitting the first codeword and the second codeword, the base station may transmit the first codeword on a first slot (or mini-slot) through a first PDSCH, and may transmit the second codeword on a second slot (or mini-slot) subsequent to the first slot (or mini-slot) through a second PDSCH. In this case, modulation coding schemes (MCS) applied to the first PDSCH and the second PDSCH may be the same. In this case, the first codeword may be transmitted through a first beam, and the second codeword may be transmitted through a second beam.

When receiving the plurality of codewords through at least one PDSCH, the user equipment may determine whether downlink data is successfully received by decoding the received codewords (S1030). If at least one of the plurality of codewords is successfully decoded, the user equipment may transmit HARQ ACK to the base station (S1040). However, if all of the plurality of codewords is not successfully decoded or an error is present although the plurality of codewords is combined, the user equipment may transmit HARQ NACK. That is, the user equipment may omit HARQ feedback with respect to some of a plurality of repeated transmissions. In other words, when receiving a plurality of codewords with respect to single data, the user equipment may transmit HARQ feedback for only some codewords.

For example, the user equipment may transmit one HARQ feedback for the plurality of codewords. In this case, if it is checked that an error has occurred when the user equipment decodes the first codeword, the user equipment does not transmit HARQ feedback for the first codeword, and may immediately decode the second codeword. Furthermore, if the second codeword is successfully decoded, the user equipment may transmit HARQ ACK. If an error occurs in the second codeword, the user equipment may correct an error occurred in at least one of the first codeword and the second codeword by combining the first codeword and the second codeword. If all errors are corrected, the user equipment may determine that downlink data has been successfully received, and may transmit HARQ ACK to the base station. However, if an error is present although the plurality of codewords has been combined, the user equipment may determine that the downlink data has not been successfully received, and may transmit HARQ NACK to the base station.

Meanwhile, if a plurality of codewords is received with respect to single data, when the firstly received codeword is successfully decoded, the user equipment may neglect a subsequently received codeword.

In the aforementioned embodiment, a case where a receiver is a base station when a transmitter is a user equipment and a receiver is a user equipment when a transmitter is a base station has been described. However, in the present disclosure, both a transmitter and a receiver may correspond to a user equipment. In this case, for example, a transmission user equipment may configure a plurality of plurality of codewords using one sidelink data, based on a repeated transmission number, information on a time resource and/or frequency resource to be used upon repeated transmission, information on a redundancy version applied to each repeated transmission, etc. received from a base station. That is, the same sidelink data may be mapped to the plurality of codewords. The plurality of codewords may be transmitted to the reception user equipment through at least one physical sidelink shared channel (PSSCH). In this case, the plurality of codewords may be simultaneously transmitted through different frequency resources or may be sequentially transmitted through different time resources. Or, the plurality of codewords may be sequentially transmitted through different frequency resources and different time resources. Or, the plurality of codewords may be simultaneously transmitted through different beams. The reception user equipment may transmit HARQ feedback (ACK or NACK) for the plurality of codewords to the transmission user equipment or a base station.

For another example, a transmission user equipment may autonomously determine the repeated transmission number of the same codeword, a time resource and/or frequency resource to be used upon repeated transmission, a redundancy version applied to each repeated transmission, etc. without control of a base station, and may transmit corresponding information to a reception user equipment through a physical sidelink control channel (PSCCH). Furthermore, the transmission user equipment may configure a plurality of codewords using one sidelink data, and may transmit the plurality of codewords to the reception user equipment. In this case, the reception user equipment may transmit at least one HARQ feedback for the plurality of codewords to the transmission user equipment.

Figure 11:
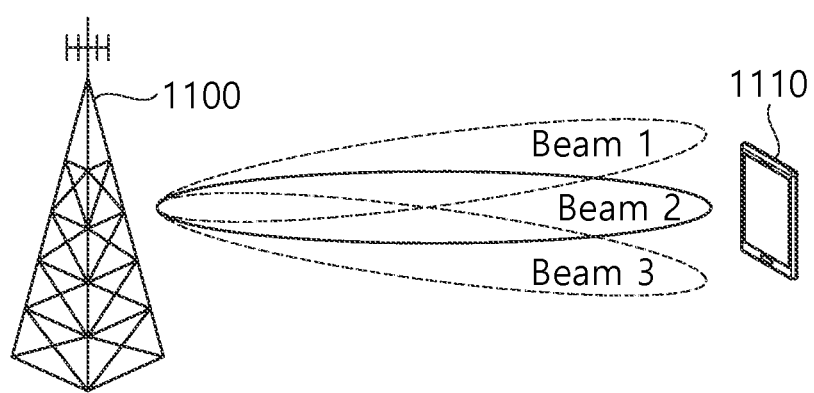
FIG. 11 is a diagram for describing multi-beamforming applied to the present disclosure.

FIG. 11 is a diagram for describing multi-beamforming applied to the present disclosure.

Beamforming means a signal processing technology used for an antenna array for directional signal transmission or reception. In the present disclosure, beamforming includes analog beamforming, digital beamforming, and hybrid beamforming.

In a mmWave (mmW) communication system, such as an NR system, a number of (or multiple) antennas may be installed in the same area because the wavelength of a signal becomes short compared to the existing communication system. For example, in a 30 GHz band, a wavelength is about 1 cm. If antennas are installed in a panel of 5 cm×5 cm at intervals of 0.5 lambda depending on a 2-dimension array form, a total of 100 antenna elements may be installed. Accordingly, in the mmW communication system, a scheme for increasing coverage or improving throughput as a beamforming gain is increased may be considered using multiple antenna elements. In this case, if a transceiver unit (TXRU) is installed so that transmission power and a phase are adjusted for each antenna element, independent beamforming may be performed for each frequency resource. However, the scheme for installing the TXRUs in all antenna elements may have low effectiveness in terms of the price. Accordingly, a method of mapping multiple antenna elements to one TXRU and controlling the direction of a beam using an analog phase shifter may be used. Such an analog beamforming method cannot perform a frequency selective beam operation because it can generate only one beam direction in all bands.

In the case of the digital beamforming, each antenna element may be equipped with a dedicated RF chain in addition to RF processing and an ADC/DAC. Signals processed by the respective antenna elements may be independently controlled in a phase and amplitude in order to optimize a channel capacity. The number of RF chains may be the same as the number of antenna elements. Accordingly, the digital beamforming method provides very high performance, but requires a high cost, implementation complexity, and high energy consumption.

Accordingly, the hybrid beamforming, that is, a form in which the digital beamforming and the analog beamforming are combined and that has the number of B TXRUs smaller than Q antenna elements, may be considered. In this case, the number of directions of beams that may simultaneously transmit signals may be limited to B or less although there is a difference depending on a method of connecting the B TXRUs and the Q antenna elements.

A transmitter may transmit data to a receiver using at least one of the beamforming methods. In this case, the existing beamforming method transmits single data using one beam. Accordingly, if an error occurs in data transmitted to the receiver, the transmitter has to retransmit the corresponding data. The existing beamforming method has no special problem although retransmission attributable to an error occurs if data that does not need to be rapidly transmitted, such as eMBB data, is transmitted, but may be problematic if data that needs to be transmitted stably and rapidly, such as URLLC data, is transmitted. Accordingly, in the present disclosure, if URLLC data is transmitted, a beam can be managed using a method different from a method if eMBB data is transmitted.

For example, as illustrated in FIG. 11, if a base station 1100 transmits data to a user equipment 1110, the base station does not transmit the data using only one optimum beam (first beam), but may transmit the data using several beams (first beam to third beam). Furthermore, if an error occurs in data received through the first beam, the user equipment 1110 does not request the retransmission of the corresponding data from the base station 1100, but stably receives the same data through the second beam and/or the third beam, thus being capable of preventing latency attributable to retransmission. That is, if an error occurs in data transmitted through a beam (first beam) optimally selected by the base station 1100, the user equipment 1110 may decode data transmitted through several different beams (second beam and third beam). In this case, the user equipment 1110 may decode the same data transmitted through several beams (first beam to third beam) by combining the same data, if necessary. In this case, a beam diversity effect can be obtained in a situation in which a channel state is not good.

Such a method may be applied to two cases of codebook-based beamforming and non-codebook-based beamforming. In this case, the codebook-based beamforming means a beamforming method whose precoding has been predetermined in a codebook. The non-codebook-based beamforming means a method whose precoding has not been predetermined in a codebook and of applying beamforming by incorporating channel state information.

Hereinafter, a multi-beamforming-based data transmission method according to the present disclosure is more specifically described with reference to FIGS. 12 and 13.

Figure 12:
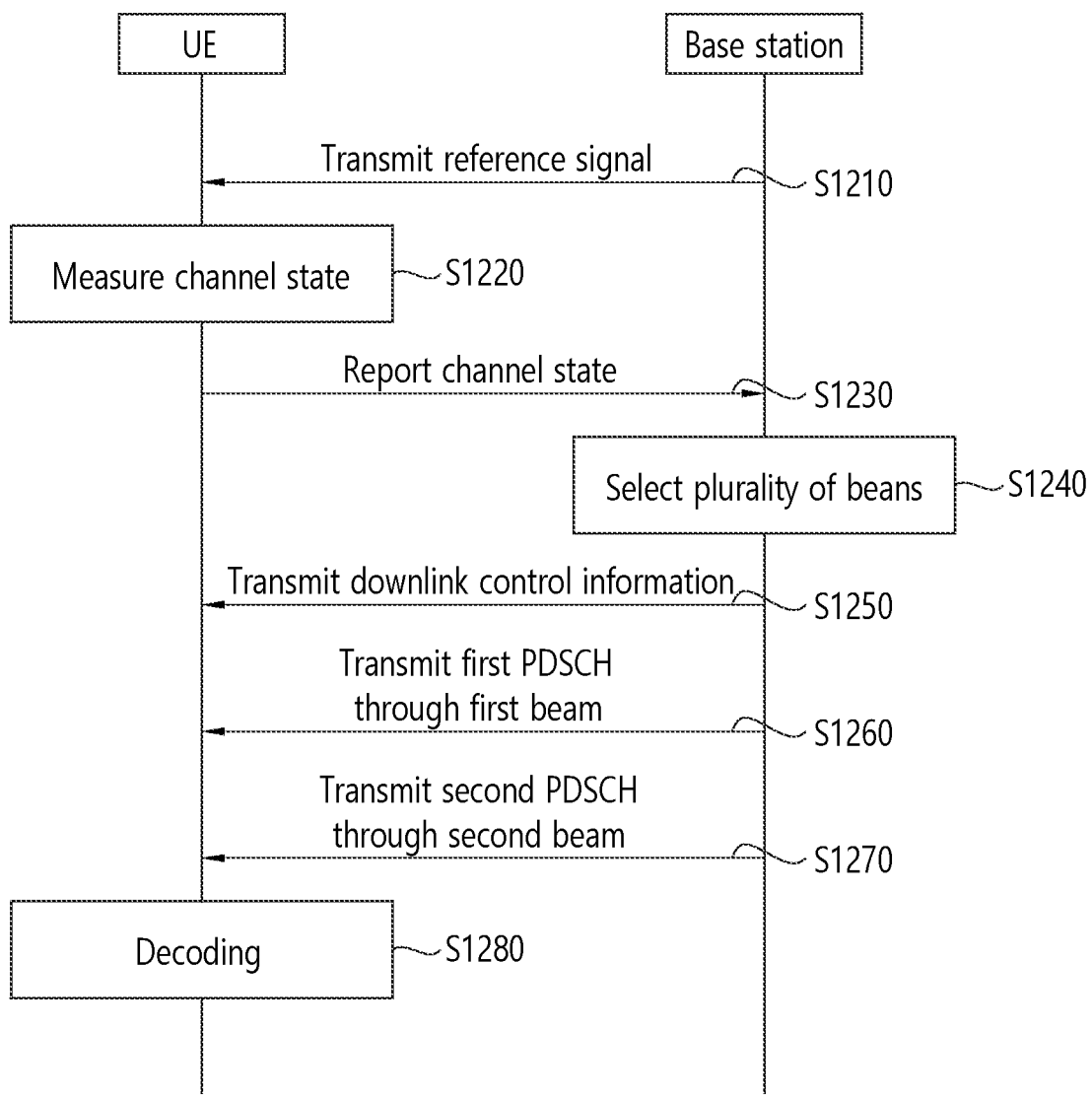
FIG. 12 is a flowchart illustrating a downlink data transmission method according to an embodiment of the present disclosure.

FIG. 12 is a flowchart illustrating a downlink data transmission method according to an embodiment of the present disclosure.

Referring to FIG. 12, when receiving a reference signal from a base station (S1210), a user equipment may measure a current channel state based on the reference signal (S1220). In this case, the reference signal may be a channel state indicator-reference signal (CSI-RS), a synchronization signal block (SSB), etc., for example.

When receiving a channel state report from the user equipment (S1230), the base station may select a plurality of beams (an optimum beam and at least one candidate beam) for downlink data transmission based on the channel state report (S1240). In this case, the at least one candidate beam may be a suboptimal beam. Furthermore, the channel state report may include a channel quality indicator (CQI), a rank indication (RI), a precoding matrix indicator (PMI), etc. The CQI may be defined as feedback information for downlink channel quality information measured by the user equipment. The RI may be defined as feedback information for downlink rank information measured by the user equipment. The PMI may be defined as feedback information for downlink precoding matrix information measured by the user equipment. If the base station has previously indicated that codebook-based beamforming will be applied with respect to the user equipment, the user equipment may transmit, to the base station, the index of precoding that makes best a channel state.

When selecting a plurality of beams, the base station may previously indicate how many beams will be selected through high layer signaling, such as a radio resource control (RRC) message, with respect to the user equipment. To this end, for example, the RRC message may include information on the number of beams, a multi-beam transmission method, etc. In this case, the information on the multi-beam transmission method may include whether a codebook is based (codebook-based or non-codebook-based), frequency division multiplexing (FDM), time division multiplexing (TDM), whether to apply FDM/TDM, etc.

If it is determined that downlink data is transmitted based on multi-beamforming, the base station may transmit, to the user equipment, downlink control information (DCI) including information on the plurality of beams (S1250). The existing DCI format may include only information on the use of one beam. Accordingly, in the present disclosure, in order to notify the user equipment that one downlink data will be transmitted through several beams, a new DCI format including information on the several beams may be used. When receiving downlink control information including the new DCI format, the user equipment can be aware that the base station will transmit the same downlink several times through multi-beamforming.

Meanwhile, the base station may configure a plurality of PDSCHs mapped to the plurality of beams, respectively, based on the information on the plurality of beams. Furthermore, the base station may transmit the plurality of configured PDSCH to the user equipment based on the multi-beamforming. In this case, the same downlink data may be mapped to the plurality of PDSCHs. FIG. 12 illustrates a case where the base station transmits the same downlink data twice, for example. In this case, the base station may transmit a first PDSCH through a first beam (S660) and simultaneously transmit a second PDSCH through a second beam (S1270). In this case, the user equipment may decode the first PDSCH received from the base station through the first beam (optimum beam) (S1280). If the first PDSCH has been successfully received, the user equipment may not decode the second PDSCH received through a next beam (second beam). That is, if a plurality of PDSCHs is received through multi-beamforming, the user equipment may neglect the remaining PDSCHs without decoding the remaining PDSCHs if any one of the plurality of PDSCHs is successfully received.

If an error is present as a result of the decoding of the first PDSCH received through the first beam, the user equipment may determine whether downlink data is successfully received by decoding the second PDSCH received through the second beam. However, if an error occurs even in the second PDSCH, the user equipment may determine whether data has been successfully received by combining data received through the first beam and data received through the second beam because the data received through the first PDSCH and the data received through the second PDSCH are the same. Accordingly, a beam diversity effect can be obtained, and the retransmission of data can be prevented.

Meanwhile, if the codebook-based beamforming is used, DCI may include an optimum beam and precoding information applied to a subsequent beam (candidate beam). By notifying the user equipment of such information, the user equipment can receive multiple beams more rapidly.

If the non-codebook-based beamforming is used, the user equipment is not separately notified of precoding information, but DCI may include information that may be helpful to the reception of multiple beams so that the user equipment can receive multiple beams more rapidly.

Figure 13:
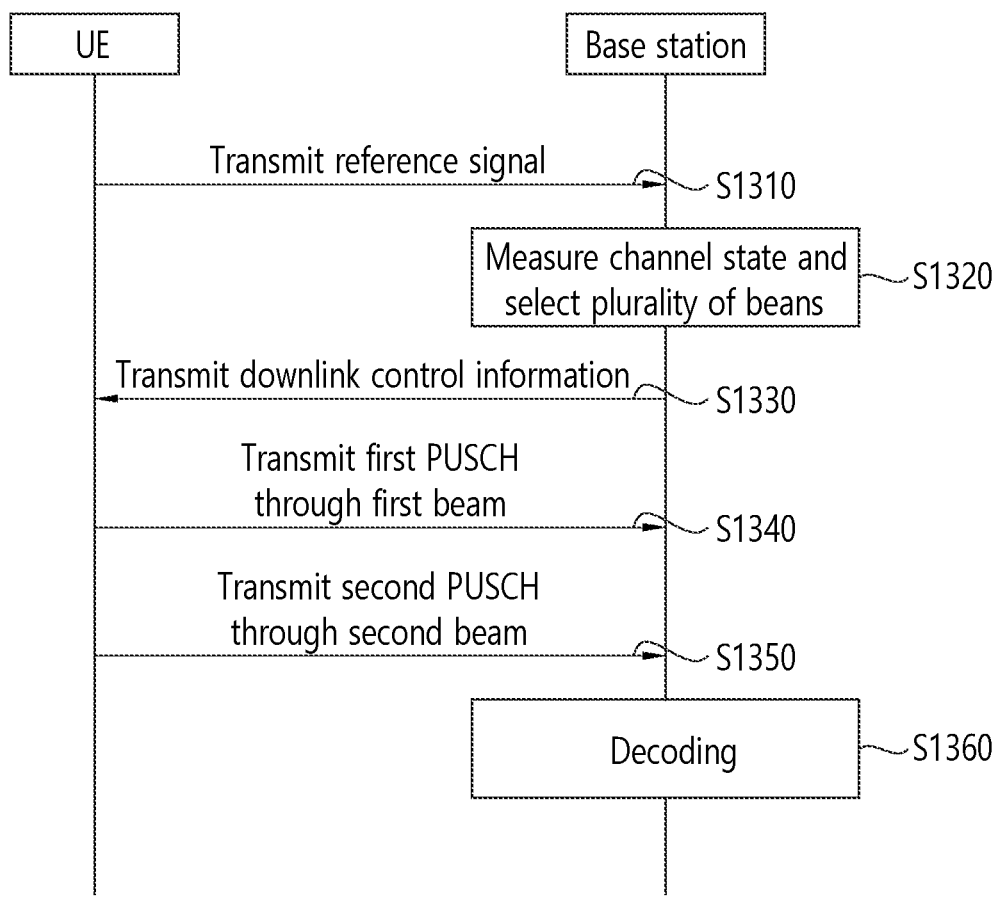
FIG. 13 is a flowchart illustrating an uplink data transmission method according to an embodiment of the present disclosure.

FIG. 13 is a flowchart illustrating an uplink data transmission method according to an embodiment of the present disclosure.

An uplink data transmission procedure is similar to the downlink data transmission procedure of FIG. 12, but is different from the downlink data transmission procedure in that so that a user equipment transmits a reference signal a base station can measure channel information.

Specifically, referring to FIG. 13, when receiving a reference signal from a user equipment (S1310), a base station may measure a current channel state based on the reference signal and select a plurality of beams (optimum beam and at least one candidate beam) for uplink data transmission (S1320). In this case, the reference signal may be a sounding reference signal (SRS), for example.

When selecting the plurality of beams, the base station may previously indicate how many beams will be selected through high layer signaling, such as an RRC message, with respect to the user equipment. In this case, the RRC message may include information, such as the number of beams and a multi-beam transmission method. In this case, the information on the multi-beam transmission method may include whether a codebook is based (codebook-based or non-codebook-based), whether FDM, TDM, or FDM/TDM is applied, etc.

If codebook-based beamforming is used, DCI having a new format may include an optimum beam and precoding information applied to a subsequent beam (candidate beam). If non-codebook-based beamforming is used, DCI having a new format may include information that may be helpful to the reception of multiple beams.

If the use of multi-beamforming is determined upon data reception, the base station may transmit, to the user equipment, downlink control information including information on the plurality of beams (S1330). In this case, the DCI may be transmitted in the new DCI format including information on the plurality of beams. When receiving the downlink control information having the new DCI format, the user equipment may transmit the same uplink data several times through multi-beamforming.

When receiving the DCI, the user equipment may configure a plurality of PUSCHs mapped to the plurality of beams, respectively, based on the information on the plurality of beams within the DCI. Furthermore, the user equipment may transmit the plurality of PUSCHs to the base station based on multi-beamforming. In this case, the same downlink data may be mapped to the plurality of PUSCHs. For example, as illustrated in FIG. 13, when transmitting the same uplink data twice, the user equipment may transmit a first PUSCH through a first beam (S1340) and simultaneously transmit a second PUSCH through a second beam (S1350).

When receiving the first PUSCH through the first beam (optimum beam) and the second PUSCH through the second beam, the base station may sequentially decode the first PUSCH and the second PUSCH (S1360). If the first PUSCH is successfully received, the base station may not decode the second PDSCH. That is, if the plurality of PUSCHs is received through multi-beamforming, the base station may not decode the remaining PUSCHs when any one of the plurality of PUSCHs is successfully received.

However, if an error is present as a result of the decoding of the first PUSCH, the base station may determine whether uplink data has been successfully received by decoding the second PDSCH. However, if an error occurs even in the second PUSCH, the base station may determine whether the data has been successfully received by combining data received through the first PUSCH and data received through the second PUSCH.

Figure 14:
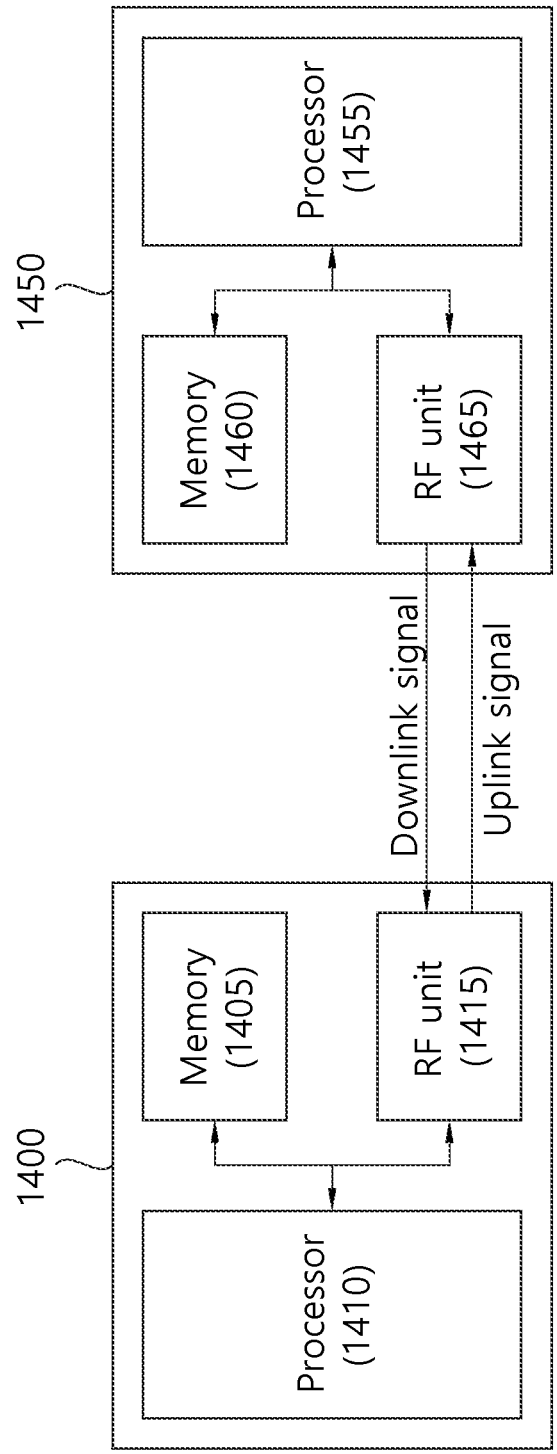
FIG. 14 is a block diagram illustrating a wireless communication system in which an embodiment of the present disclosure is implemented.

FIG. 14 is a block diagram illustrating a wireless communication system in which an embodiment of the present disclosure is implemented.

Referring to FIG. 14, a user equipment 1400 includes a memory 1405, a processor 1410 and a radio frequency (RF) unit 1415. The memory 1405 is coupled to the processor 1410 and stores various types of information for driving the processor 1410. The RF unit 1415 is coupled to the processor 1410 and transmits and/or receives a radio signal. For example, the RF unit 1415 may receive, from a base station 1450, configuration and/or control information of the RRC message, the DCI, etc. and the downlink signals, such as the PDSCH, the HARQ ACK/NACK, the CSI-RS, and the SSB disclosed in this specification. Furthermore, the RF unit 1415 may transmit uplink signals, such as the CQI report, the SRS, the PUSCH, and the HARQ ACK/NACK disclosed in this specification, to the base station 1450 or may transmit and receive PSSCHs to and from another user equipment (not illustrated).

The processor 1410 implements the functions, processes and/or methods of the user equipment proposed in this specification. Specifically, the processor 1410 performs the operations of the user equipment of FIGS. 5 to 13. For example, the processor 1410 may configure a plurality of PUSCHs, a plurality of codewords and/or a plurality of PSSCH according to an embodiment of the present disclosure. In all the embodiments of this specification, an operation of the user equipment 1400 may be implemented by the processor 1410.

The memory 1405 stores control information, configuration information, etc. according to this specification, and may provide the control information, the configuration information, etc. to the processor 1410 in response to a request from the processor 1410.

The base station 1450 includes a processor 1455, a memory 1460 and a radio frequency (RF) unit 1465. The memory 1460 is coupled to the processor 1455 and stores various types of information for driving the processor 955. The RF unit 1465 is coupled to the processor 1455 and transmits and/or receives radio signals. The processor 1455 implements the functions, processes and/or methods proposed in this specification. In the aforementioned embodiments, an operation of the base station may be implemented by the processor 1455. The processor 1455 may generate the RRC message, the downlink control information, etc. disclosed in this specification or may configure a plurality of PDSCHs and/or a plurality of codewords for one downlink data. Furthermore, the processor 1455 may generate the RRC message, the downlink control information, etc. disclosed in this specification, may determine whether to apply multi-beamforming based on a channel state, and may configure the plurality of PDSCHs mapped to a plurality of beams, respectively, using the one downlink data based on the determination.

The processor may include application-specific integrated circuits (ASICs), other chipsets, logic circuits and/or data processing devices. The memory may include a read-only memory (ROM), a random access memory (RAM), a flash memory, a memory card, a storage medium and/or other storage devices. The RF unit may include a baseband circuit for processing a radio signal. When an embodiment of the present disclosure is implemented as software, the aforementioned scheme may be implemented as a module (process, function, etc.) for performing the aforementioned function. The module may be stored in the memory and executed by the processor. The memory may be placed inside or outside the processor and connected to the processor using a variety of well-known means.

In the above exemplary system, although the methods have been described based on the flowcharts in the form of a series of steps or blocks, the disclosure is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the disclosure.

What is claimed is:

1. A method of transmitting data in a wireless communication system, the method comprising steps of:
  receiving information on a repeated transmission number of physical uplink shared channel (PUSCH) regarding uplink data from a base station;
  configuring a plurality of PUSCHs corresponding to the repeated transmission number of the PUSCH, wherein the uplink data is identically mapped to the plurality of PUSCHs; and
  sequentially transmitting the plurality of PUSCHs within one slot,
  wherein the plurality of PUSCHs include a first PUSCH and a second PUSCH,
  wherein the one slot includes a first mini-slot and a second mini-slot each of which consists of at least one orthogonal frequency division multiplexing (OFDM) symbol,
  wherein the first PUSCH is transmitted in the first mini-slot and the second PUSCH is transmitted in the second mini-slot,
  wherein frequency hopping is applied to each transmission of the first PUSCH transmission and the second PUSCH transmission,
  wherein the repeated transmission of the PUSCH includes a case where the repeated transmission of the PUSCH is performed based on an uplink grant and a case where the repeated transmission of the PUSCH is performed without the uplink grant, and
  wherein a signaling which indicates a format regarding the repeated transmission of the PUSCH is different according to whether the uplink grant is present or not.

2. The method of claim 1, further comprising a step of receiving information on a configuration for activating or deactivating the repeated transmission of the PUSCH from the base station.

3. The method of claim 1, wherein the information on the repeated transmission number of the PUSCH is generated based on a channel quality indicator (CQI) report received from the user equipment.

4. The method of claim 1, wherein:
  the information on the repeated transmission number of the PUSCH is included in downlink control information (DCII received from the base station, and
  the DCI comprises information on a plurality of modulation and coding schemes (MCSs),
  the information on the plurality of MCSs includes information on MCS applied to the first PUSCH and information on an MCS applied to the second PUSCH.

5. The method of claim 4, wherein an MCS having a level than that of the first PUSCH is applied to the second PUSCH.

6. The method of claim 1, further receiving, from the base station, HARQ hybrid automatic retransmission request-acknowledge (ACK) for any one of the first PUSCH and the second PUSCH.

* * * * *

UNITED STATES PATENT AND TRADEMARK OFFICE
CERTIFICATE OF CORRECTION

Page 1 of 1

PATENT NO. : 11,083,001 B2
APPLICATION NO. : 17/253628
DATED : August 3, 2021
INVENTOR(S) : Su Han Choi It is certified that error appears in the above-identified patent and that said Letters Patent is hereby corrected as shown below:

On the Title Page

Column 1, item (73) the name of the Assignee should be corrected to "INDUSTRY-ACADEMIC COOPERATION FOUNDATION, DANKOOK UNIVERSITY" (instead of "INDUSTRY-ACADEMIC COOPERATION FOUNDATIO"

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*